(12) United States Patent
Takamoto et al.

(10) Patent No.: US 9,246,343 B2
(45) Date of Patent: Jan. 26, 2016

(54) CHARGING APPARATUS, CHARGING SYSTEM, AND METHOD OF CONNECTING CHARGING TERMINAL

(71) Applicant: NINTENDO CO., LTD., Kyoto (JP)

(72) Inventors: Junji Takamoto, Kyoto (JP); Yositomo Goto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 466 days.

(21) Appl. No.: 13/897,809

(22) Filed: May 20, 2013

(65) Prior Publication Data

US 2014/0097789 A1 Apr. 10, 2014

(30) Foreign Application Priority Data

Oct. 10, 2012 (JP) ................................. 2012-224820

(51) Int. Cl.
*H02J 7/00* (2006.01)

(52) U.S. Cl.
CPC .......... *H02J 7/0044* (2013.01); *Y10T 29/49208* (2015.01)

(58) Field of Classification Search
CPC .................................. H02J 7/00; H02J 7/0044
USPC ........................................................ 320/107
See application file for complete search history.

(56) References Cited

U.S. PATENT DOCUMENTS

| 2012/0133328 A1* | 5/2012 | Chen ...................... H02J 7/0044 320/115 |
| 2012/0274282 A1* | 11/2012 | Yoneyama ............ H02J 7/0044 320/115 |

FOREIGN PATENT DOCUMENTS

JP 2005-117703 4/2005

* cited by examiner

*Primary Examiner* — Richard Isla Rodas
*Assistant Examiner* — Dung V Bui
(74) *Attorney, Agent, or Firm* — Nixon & Vanderhye P.C.

(57) ABSTRACT

An example of a charging apparatus includes a housing, a first movable member, and a second movable member. The first movable member is configured to be pressed down. The second movable member accommodates a charging terminal in the housing in a reference state, and when the first movable member has been pressed down, causes the charging terminal to protrude through an opening portion provided in the housing, so as to enter a terminal contact state. The first movable member and the second movable member are configured such that an amount of movement of the charging terminal during a period from the reference state to a predetermined intermediate state is smaller than the amount of movement during the same period in a case where the charging terminal moves from the reference state to the terminal contact state by an amount proportional to an amount of pressing down the first movable member.

20 Claims, 17 Drawing Sheets

CHARGING APPARATUS, CHARGING SYSTEM, AND METHOD OF CONNECTING CHARGING TERMINAL

CROSS REFERENCE TO RELATED APPLICATION

The disclosure of Japanese Patent Application No. 2012-224820, filed on Oct. 10, 2012, is incorporated herein by reference.

FIELD

The technology relates to a charging apparatus for charging a portable apparatus, a charging system, and a method of connecting a charging terminal.

BACKGROUND AND SUMMARY

Conventionally, there is a technique of, in a charging apparatus for charging a portable apparatus such as a portable device, causing a charging terminal to protrude in accordance with the mounting of the portable apparatus on the charging apparatus.

Conventionally, if the portable apparatus has been moved in a shifting manner, the charging terminal may become caught by the portable apparatus. This may make it difficult to mount the portable apparatus on the charging apparatus.

Therefore, the present application discloses a charging apparatus, a charging system, and a method of connecting a charging terminal that further facilitate the mounting of a portable apparatus.

(1)

An example of a charging apparatus according to the present specification charges a portable apparatus. The charging apparatus includes a housing, a first movable member, a charging terminal, and a second movable member.

The first movable member is configured such that at least a part of the first movable member protrudes to an outside of the housing through a first opening portion provided in the housing, and configured to be pressed down by mounting the portable apparatus on the housing. The second movable member is connected to the charging terminal, and accommodates the charging terminal in the housing in a reference state where the first movable member is not pressed down, and when the first movable member has been pressed down, causes the charging terminal to protrude to the outside of the housing through a second opening portion provided in the housing, so as to enter a terminal contact state where the charging terminal can come into contact with a charge-receiving terminal of the portable apparatus.

Here, the first movable member and the second movable member are configured such that an amount of movement of the charging terminal during a period from the reference state to a predetermined intermediate state is smaller than the amount of movement during the same period in a case where the charging terminal moves from the reference state to the terminal contact state by an amount proportional to an amount of pressing down the first movable member.

On the basis of the above configuration (1), during the period from the state where the first movable member is starting to be pressed down to the intermediate state, it is possible to make the amount of protrusion of the charging terminal smaller (than in the case where the amount of movement of the charging terminal is proportional to the amount of pressing down the first movable member). This makes it possible to reduce the possibility that the charging terminal becomes caught by the portable apparatus when the portable apparatus is mounted on the charging apparatus, thereby enabling a user to easily mount the portable apparatus on the charging apparatus.

(2)

The first movable member and the second movable member may be configured such that the amount of movement of the charging terminal per unit amount of pressing down the first movable member is larger in a predetermined second state where the amount of pressing down the first movable member from the reference state is relatively large, than in a predetermined first state where the amount of pressing down the first movable member from the reference state is relatively small.

On the basis of the above configuration (2), in the state where the first movable member is starting to be pressed down, the change in the amount of movement of the charging terminal is small, and in the state where the first movable member is deeply pressed down, the change in the amount of movement of the charging terminal is great. This makes it possible to reduce the possibility that the charging terminal becomes caught in the state where the first movable member is starting to be pressed down, and also possible to cause the charging terminal to protrude sufficiently. This enables the charging apparatus to certainly charge the portable apparatus.

(3)

At least one of the first movable member and the second movable member may be configured to be rotationally movable. In this case, the first movable member moves the second movable member by a first abutment part of the first movable member pressing a second abutment part of the second movable member, the first abutment portion being a portion of the first movable member that abuts the second movable member, the second abutment portion being a portion of the second movable member that abuts the first movable member. Further, the first movable member and the second movable member are configured such that an angular difference between a moving direction of the first abutment part and a moving direction of the second abutment part is smaller in the second state than in the first state.

On the basis of the above configuration (3), the configuration is such that the angular difference in the first state is greater than the angular difference in the second state. This makes it possible to make the change in the amount of movement of the charging terminal smaller in the state where the first movable member is starting to be pressed down, and possible to make the change in the amount of movement of the charging terminal greater in the state where the first movable member is further pressed down. Thus, it is possible to reduce the possibility that the charging terminal becomes caught. This also enables the charging apparatus to certainly charge the portable apparatus.

(4)

The first movable member may be rotatable about a predetermined first shaft. The second movable member may be rotatable about a second shaft generally parallel to the first shaft. In this case, the first movable member moves the second movable member by rotating about the first shaft while changing a position in the first movable member that abuts the second movable member and a direction in which the first movable member presses down the second movable member.

On the basis of the above configuration (4), the two movable members are rotatable so that the rotation of the first movable member causes the second movable member to rotate. This makes it possible to make the change in the amount of movement of the charging terminal smaller in the state where the first movable member is starting to be pressed down, and possible to make the change in the amount of movement of the charging terminal greater in the state where the first movable member is further pressed down. Thus, it is possible to reduce the possibility that the charging terminal becomes caught. This also enables the charging apparatus to certainly charge the portable apparatus.

(5)

The first movable member may include a press-down surface and a first abutment surface. The press-down surface protrudes through the first opening portion in the reference state, and comes into contact with the portable apparatus when the portable apparatus has been mounted on the housing. The first abutment surface is provided on the same side as the press-down surface with respect to the first shaft, and abuts the second movable member. In this case, the second movable member may include an abutment portion and a supporting portion. The abutment portion has at an end portion thereof a second abutment surface configured to abut the first abutment surface. The supporting portion is connected to the abutment portion at one end thereof, and supports the charging terminal at the other end.

On the basis of the above configuration (5), it is possible to easily achieve the above configuration (4).

(6)

The first movable member may be configured to be rotationally movable, and configured such that an amount of rotation of the first movable member per unit amount of pressing down the first movable member is larger in a predetermined second state where the amount of pressing down the first movable member from the reference state is relatively large, than in a predetermined first state where the amount of pressing down the first movable member from the reference state is relatively small.

On the basis of the above configuration (6), the amount of rotation of the first movable member is adjusted in accordance with the pressing down of the portable apparatus. This makes it possible to reduce the possibility that the charging terminal becomes caught.

(7)

The first movable member and the second movable member may be configured such that an amount of movement of the second movable member per unit amount of movement of the first movable member is larger in a predetermined second state where the amount of pressing down the first movable member from the reference state is relatively large, than in a predetermined first state where the amount of pressing down the first movable member from the reference state is relatively small.

On the basis of the above configuration (7), the amount of movement of the second movable member is adjusted in accordance with the movement of the first movable member. This makes it possible to reduce the possibility that the charging terminal becomes caught.

(8)

The charging apparatus may further include a biasing member configured to bias the second movable member so that the second movable member presses the first movable member so as to enter the reference state.

On the basis of the above configuration (8), it is possible to maintain the two movable members in the reference state with one biasing member. This makes it possible to simplify the structure of the charging apparatus.

(9)

The charging apparatus may further include a first biasing member and a second biasing member. The first biasing member biases the first movable member so as to enter the reference state. The second biasing member biases the second movable member so that the charging terminal is accommodated in the housing. In this case, the first movable member is away from the second movable member in the reference state, and moves the second movable member by abutting the second movable member in accordance with the pressing down of the first movable member by a predetermined amount or more.

On the basis of the above configuration (9), it is possible to prevent the first movable member and the second movable member from coming into contact with each other in the reference state. This makes it possible to prevent the charging terminal from moving until the first movable member is pressed down by a predetermined amount. Thus, it is possible to reduce the possibility that the charging terminal becomes caught.

(10)

The first movable member and the second movable member may be configured such that positions in the first movable member that abut the second movable member change discontinuously during a change from the reference state to the terminal contact state.

On the basis of the above configuration (10), it is possible to discontinuously change the proportion of the amount of movement of the charging terminal to the pressing down of the first movable member while the abutment positions change from the reference state to the terminal contact state. This makes it possible to reduce the possibility that the charging terminal becomes caught by the portable apparatus.

(11)

The charging apparatus may further include a rotating member provided such that at least a part of the rotating member protrudes to the outside of the housing through a third opening portion provided on a mounting surface on which the portable apparatus is mounted in the housing, the rotating member being rotatable in a predetermined direction.

On the basis of the above configuration (11), if the portable apparatus is shifted from a correct mounting position when the portable apparatus is connected to the charging apparatus, the rotation of the rotating member corrects the position of the portable apparatus, thereby mounting the portable apparatus. This enables the user to easily mount the portable apparatus at a correct position without accurately positioning the charging apparatus. This makes it possible to certainly charge the portable apparatus.

(12)

The rotating member may be composed of at least two rotating members. In this case, the first movable member may be provided so as to protrude through the first opening portion formed at a position between the two rotating members, and so as not to protrude beyond a line segment connecting extremity portions of the two rotating members.

On the basis of the above configuration (12), if holes corresponding to the rotating members are provided in the portable apparatus at positions corresponding to the rotating members, it is possible to prevent the first movable member from being pressed down by the portable apparatus 2 in the state where the rotating members are not inserted in the holes of the portable apparatus. This makes it possible to reduce the possibility that the charging terminal becomes caught.

(13)

The rotating member may be provided so as to protrude beyond the first movable member with respect to a predetermined reference plane.

On the basis of the above configuration (13), when the portable apparatus is mounted on the charging apparatus, the portable apparatus is likely to come into contact with the rotating member before with the first movable member. This makes it possible to reduce the possibility that the first movable member becomes pressed down in the state where the rotating member is not inserted in the hole of the portable apparatus 2. Thus, it is possible to further reduce the possibility that the charging terminal becomes caught.

It should be noted that on the basis of the above configurations (11) to (13), even if the amount of movement of the charging terminal is proportional to the amount of pressing down the first movable member, it is possible to achieve the effects of the configurations.

In addition, the present specification further discloses an example of a charging system including the charging apparatus and the portable apparatus, according to the above configurations (1) to (13).

It should be noted that in the charging system, the portable apparatus and the charging apparatus may be configured such that the portable apparatus does not move the first movable member in a state where a part of the rotating member is not inserted in the hole of the portable apparatus. This prevents the charging terminal from protruding in the state where the position of the charging terminal of the charging apparatus and the position of the charge-receiving terminal of the portable apparatus do not coincide with each other. This makes it possible to reduce the possibility that the charging terminal comes into contact with (becomes caught by) a portion other than the charge-receiving terminal of the portable apparatus. It should be noted that it is possible to obtain this effect even if the amount of movement of the charging terminal is proportional to the amount of pressing down the first movable member.

In addition, in the charging system, the first movable member and the second movable member may be configured such that the charging terminal is accommodated in the housing in a state where a part of the rotating member is not inserted in the hole of the portable apparatus. This prevents the charging terminal from protruding from the housing in the state where the position of the charging terminal of the charging apparatus and the position of the charge-receiving terminal of the portable apparatus do not coincide with each other. This makes it possible to reduce the possibility that the charging terminal comes into contact with (becomes caught by) a portion other than the charge-receiving terminal of the portable apparatus. It should be noted that it is possible to obtain this effect even if the amount of movement of the charging terminal is proportional to the amount of pressing down the first movable member.

In addition, the present specification discloses an example of a method of connecting a charging terminal of a charging apparatus for charging a portable apparatus to a charge-receiving terminal of the portable apparatus.

On the basis of the charging apparatus, the charging system, and the method of connecting charging terminals, it is possible to mount a portable apparatus on a charging apparatus more easily by reducing the possibility that the charging terminal becomes caught by the portable apparatus.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
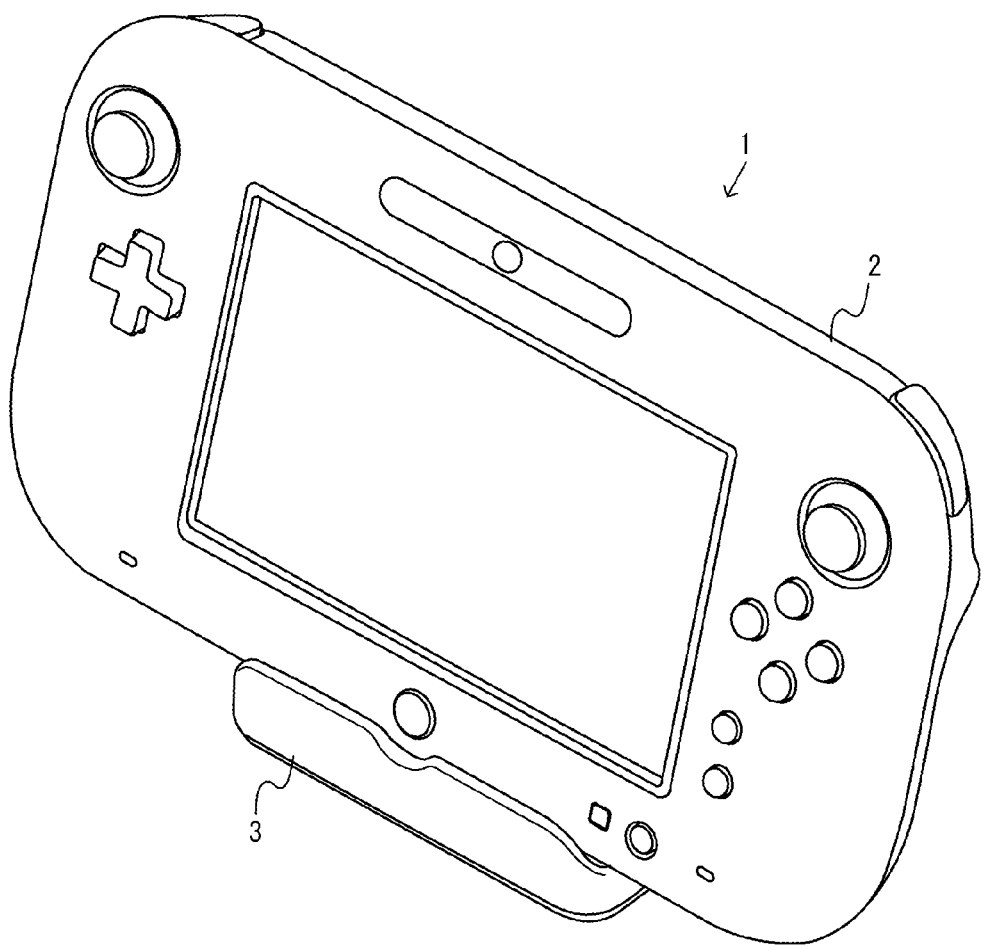
FIG. 1 is a diagram showing a non-limiting example of a charging system according to an exemplary embodiment.

With reference to the drawings, a description is given below of a charging apparatus, a charging system, and a method of connecting a charging terminal, according to an exemplary embodiment. FIG. 1 is a diagram showing an example of the charging system according to the exemplary embodiment. In FIG. 1, a charging system 1 includes a portable apparatus 2 and a charging apparatus 3. FIG. 1 shows the state where the portable apparatus 2 is mounted on (attached to) the charging apparatus 3. The charging system 1 is such that when the portable apparatus 2 has been mounted on the charging apparatus 3, the charging apparatus 3 charges the portable apparatus 2.

The portable apparatus 2 is an electronic device of such a size that it can be carried around (in other words, it is portable). The portable apparatus 2 may have any functions, and may be, for example, a handheld game apparatus, an operation apparatus (a game controller), a tablet terminal, a mobile phone, or the like.

The charging apparatus 3 charges the portable apparatus 2 mounted thereon. The charging apparatus 3 is connected (or detachably connected) to an AC adapter and a power plug via a power cord (not shown), so that the connection of the power plug to an outlet of an external power source (mains electricity) results in supplying power to the charging apparatus 3. The charging apparatus 3 sends the supplied power to the portable apparatus 2 to charge the portable apparatus 2.

[Configuration of Portable Apparatus]

Figure 2:
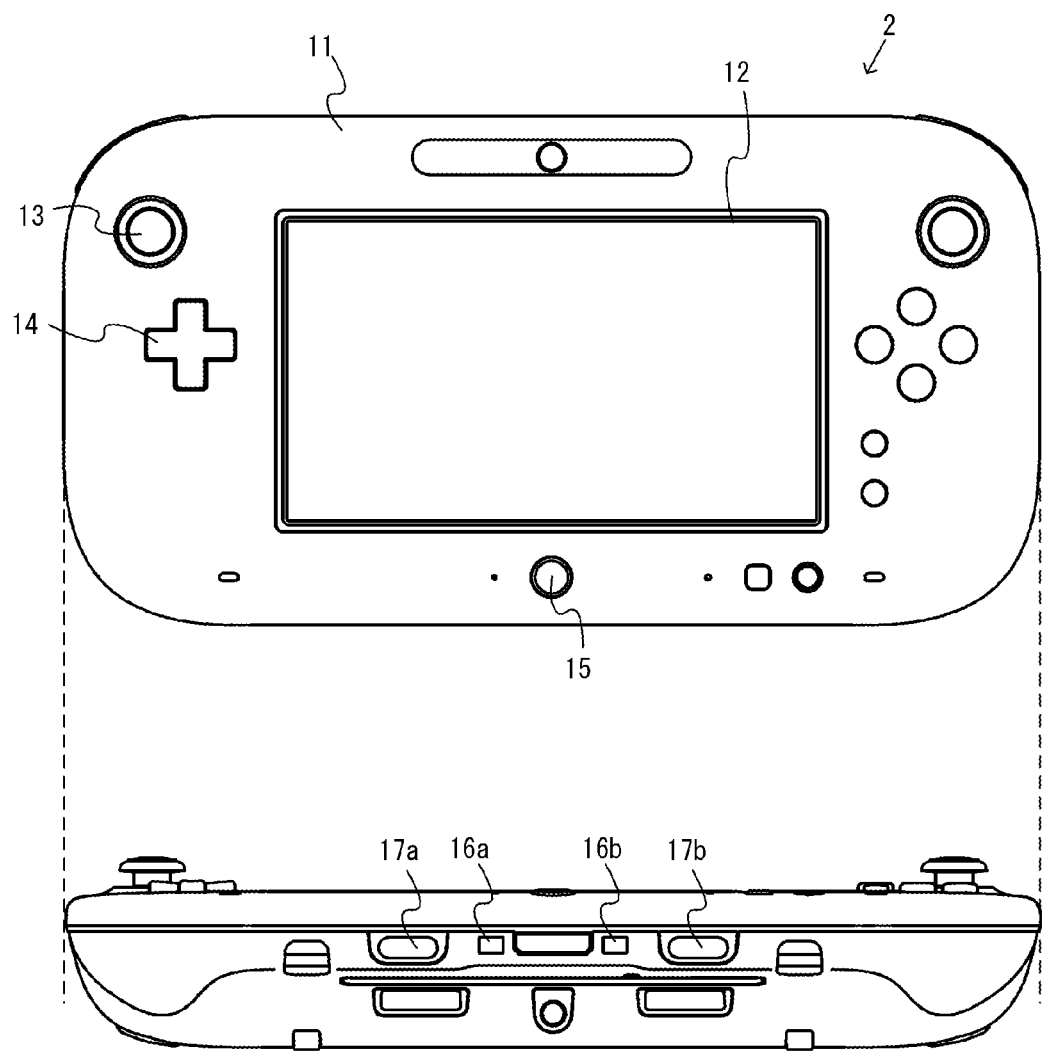
FIG. 2 is a diagram showing a non-limiting example of the configuration of a portable apparatus.

FIG. 2 is a diagram showing an example of the configuration of the portable apparatus 2. The portable apparatus 2 includes a housing 11. The housing 11 may be of any shape. In the exemplary embodiment, the housing 11 has a generally plate-like shape. Further, the portable apparatus 2 (the housing 11) may be of any size. In the exemplary embodiment, the portable apparatus 2 has a vertical length of from about 100 to 150 mm and a horizontal length of from about 200 to 250 mm, and therefore is relatively large as a portable electronic device.

In the exemplary embodiment, the portable apparatus 2 includes a display section 12 composed, for example, of a liquid crystal display apparatus or the like. The display section 12 is provided on the front surface of the plate-like housing 11. Further, the portable apparatus 2 includes an operation stick 13, a directional button 14, a button (power button) 15, and the like as an input section with which a user performs an operation. It should be noted that the input section may have any specific configuration, and the portable apparatus 2 may include, for example, a touch panel provided on the screen of the display section 12, a microphone, and the like.

In addition, the portable apparatus 2 includes charge-receiving terminals capable of being connected to the charging apparatus 3. In the exemplary embodiment, the portable apparatus 2 includes a pair of (two) charge-receiving terminals 16a and 16b on the lower surface (the lower side surface) of the housing 11. It should be noted that in another embodiment, charge-receiving terminals may be located at any positions, or charge-receiving terminals may be provided in a plurality of portions.

In addition, in the portable apparatus 2, holes (recessed portions) 17a and 17b are formed on the surface on which the charge-receiving terminals 16a and 16b are provided. The holes 17a and 17b are used to position the portable apparatus 2 relative to the charging apparatus 3, and are formed of such sizes that rotating members (rotating members 26a and 26b shown in FIG. 3) included in the charging apparatus 3 can be inserted into the holes 17a and 17b.

[Configuration of Charging Apparatus]

Figure 3:
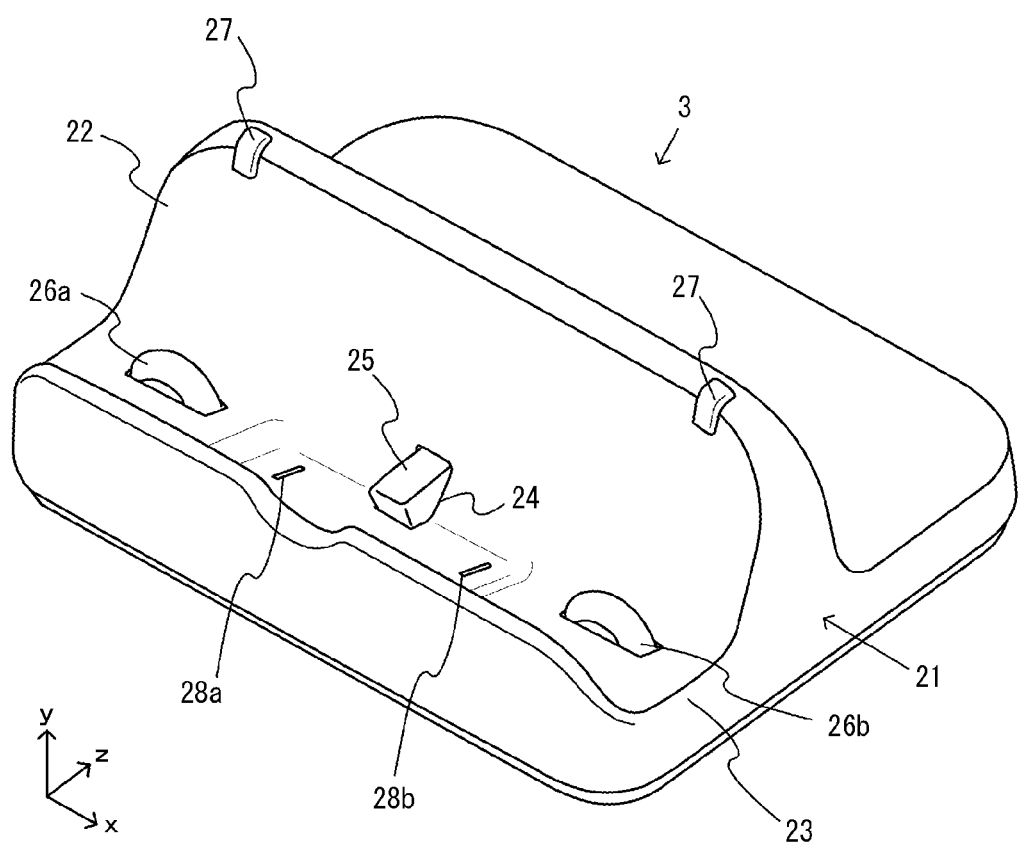
FIG. 3 is a diagram showing a non-limiting example of the configuration of a charging apparatus.

FIG. 3 is a diagram showing an example of the configuration of the charging apparatus 3. As shown in FIG. 3, the charging apparatus 3 includes a housing 21. In the exemplary embodiment, the housing 21 is formed in such a shape as to support the portable apparatus 2. Specifically, the housing 21 has a wall portion 22 and a groove portion 23. The wall portion 22 supports the portable apparatus 2 such that the back surface of the portable apparatus 2 is mounted along a predetermined supporting surface (here, a surface formed by the wall portion 22). It should be noted that in the exemplary embodiment, cushion members 27 are provided in the wall portion 22 at such positions as to abut the portable apparatus 2 when mounted. The cushion members 27 also function to prevent slippage. Further, the groove portion 23 is a portion into which a part (the lower side portion) of the portable apparatus 2 is inserted when the portable apparatus 2 and the charging apparatus 3 are connected together. The groove portion 23 is formed in such a shape as to generally fit the shape of the part of the portable apparatus 2. The above configuration enables the housing 21 to support the portable apparatus 2 at a predetermined tilt (see FIG. 1). It should be noted that the configuration of the housing 21 is merely illustrative, and the charging apparatus 3 may have any configuration so long as it allows the portable apparatus 2 to be mounted thereon.

It should be noted that in the exemplary embodiment, the groove portion 23 is formed so as to extend in a direction parallel to the supporting surface (here, a left-right direction (an x-axis direction shown in FIG. 3)) such that the end portions of the groove portion 23 in this direction are open (see FIG. 3). Thus, the housing 21 allows a portable apparatus of any size to be mounted thereon without limitation of the length of the groove portion 23 (the length in the left-right direction). Further, it is possible to miniaturize the charging apparatus 3 even if the portable apparatus 2 is of a relatively large size as in the exemplary embodiment. That is, it is possible to form the charging apparatus 3 in a size smaller than the vertical and horizontal sizes of the portable apparatus 2, independently of the vertical and horizontal sizes of the portable apparatus 2. Further, the charging apparatus 3 allows portable apparatuses of various shapes or sizes to be mounted thereon, and therefore can provide a versatile charging apparatus.

In addition, the charging apparatus 3 includes a first movable member 25. In the exemplary embodiment, the first movable member 25 is a button (switch) member that is pressed down by the portable apparatus 2 when the portable apparatus 2 is mounted on the charging apparatus 3. The first movable member 25 is provided on the surfaces of the housing 21 that abut the portable apparatus 2 when the housing 21 supports the portable apparatus 2. In the exemplary embodiment, the first movable member 25 is provided in the groove portion 23. Specifically, the first movable member 25 is provided near the boundary between a bottom surface portion and a wall portion of the groove portion 23 (see FIG. 3). As shown in FIG. 3, the first movable member 25 is provided such that at least a part of the first movable member 25 protrudes to the outside of the housing 21 through a first opening portion 24 provided in the housing 21. That is, a press-down surface (a press-down surface 25b shown in FIG. 5) that comes into contact with the portable apparatus 2 when the portable apparatus 2 has been mounted on the housing 21 is provided so as to protrude through the first opening portion 24.

In addition, the first movable member 25 is configured to be pressed down by mounting the portable apparatus 2 on the housing 21. That is, when the portable apparatus 2 is mounted on the charging apparatus 3, the first movable member 25 becomes pressed by the portable apparatus 2, and thereby can move in the direction of being inserted into the housing 21 through the first opening portion 24. The first movable member 25 according to the exemplary embodiment is configured to be pressed down in a generally downward direction (a negative y-axis direction shown in FIG. 3). It should be noted that in the present specification, the state where the first movable member 25 is not pressed down (the state where the portable apparatus 2 is not mounted on the charging apparatus 3) is referred to as a "reference state". Although described in detail later, the first movable member 25 is biased by a biasing member 35 described later, so as to enter the reference state.

As shown in FIG. 3, second opening portions 28a and 28b are formed in the housing 21. The second opening portions 28a and 28b are formed at positions corresponding to the charge-receiving terminals 16a and 16b, respectively, of the portable apparatus 2 when the portable apparatus 2 is mounted on the charging apparatus 3. That is, when the portable apparatus 2 is mounted on the charging apparatus 3, the second opening portion 28a is at a position opposing the charge-receiving terminal 16a, and the second opening portion 28b is at a position opposing the charge-receiving terminal 16b.

Figure 4:
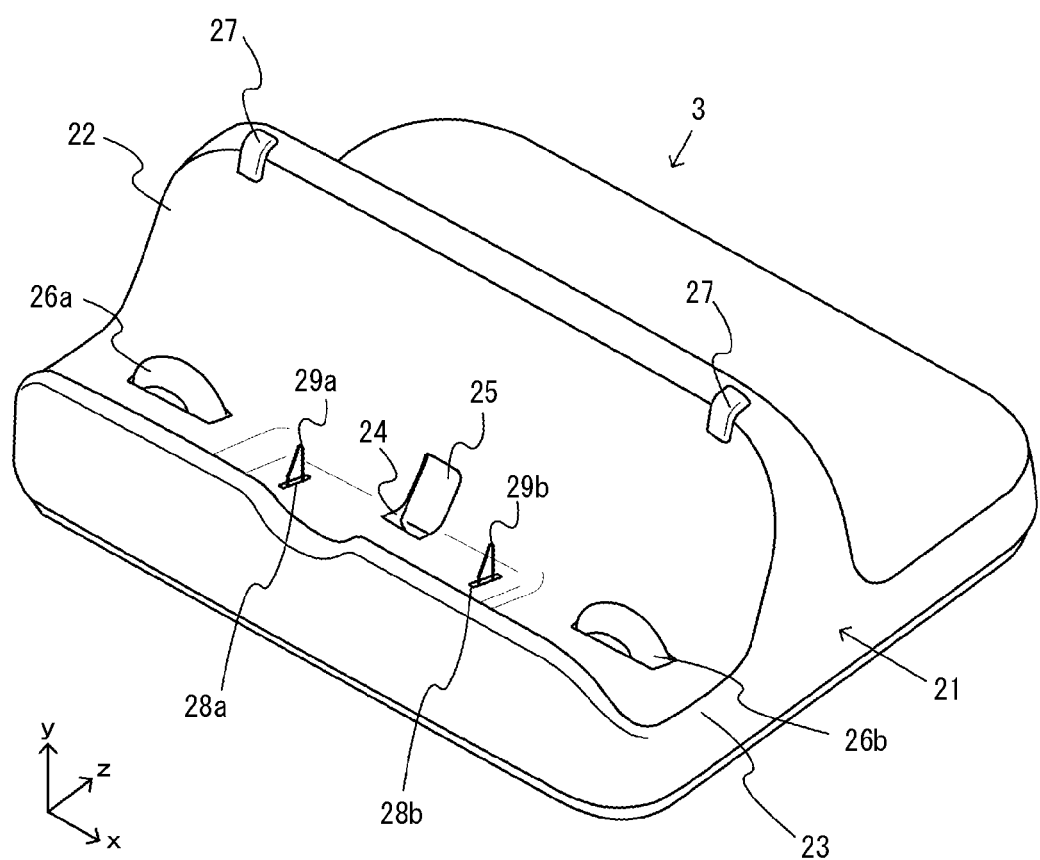
FIG. 4 is a diagram showing a non-limiting example of the charging apparatus in the state where a first movable member is pressed down.
Figure 5:
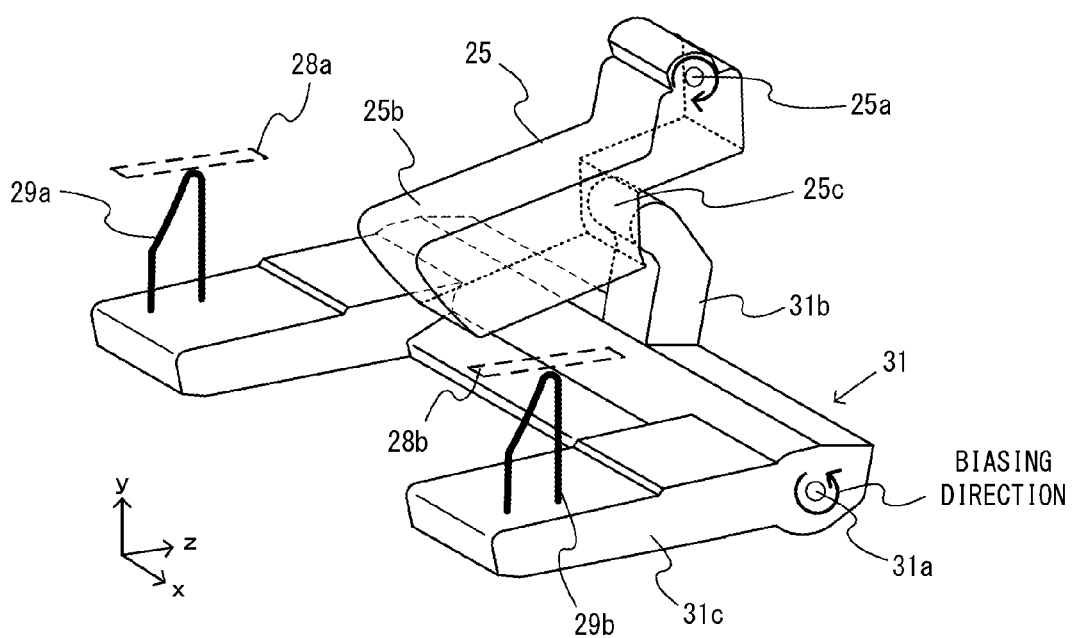
FIG. 5 is a diagram showing a non-limiting example of the internal configuration of the charging apparatus.
Figure 6:
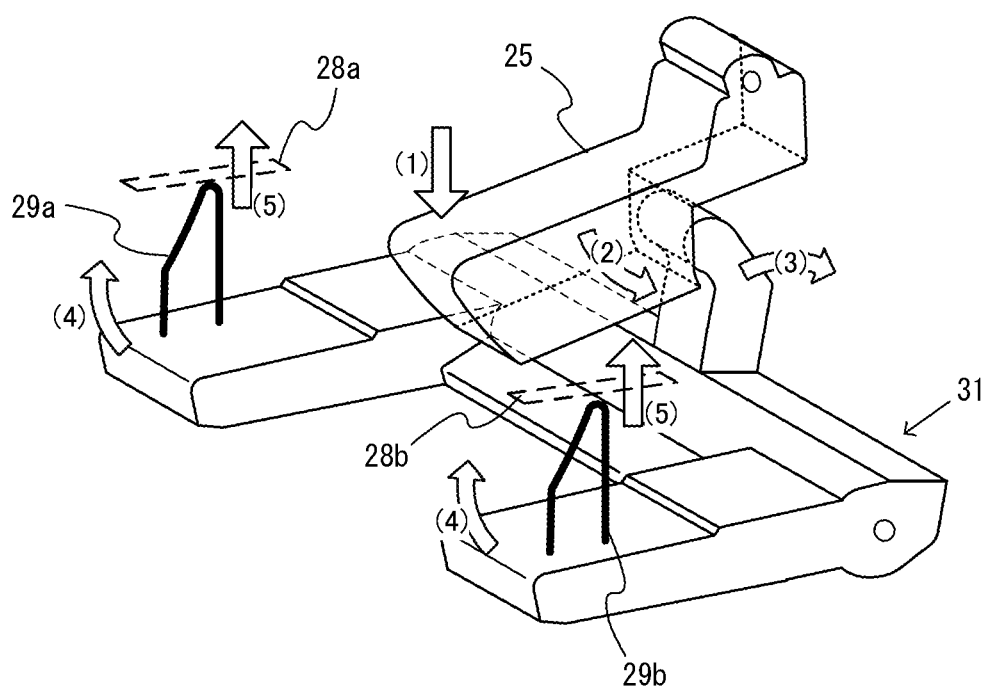
FIG. 6 is a diagram showing non-limiting examples of the directions in which the components shown in FIG. 5 are movable.

FIG. 4 is a diagram showing an example of the charging apparatus 3 in the state where the first movable member 25 is pressed down. As shown in FIG. 4, the charging apparatus 3 includes charging terminals 29a and 29b. The charging terminals 29a and 29b are provided so as to be located inside the housing 21 in the reference state shown in FIG. 3, and so as to protrude through the second opening portions 28a and 28b, respectively, when the first movable member 25 has been pressed down as shown in FIG. 4. That is, when the first movable member 25 has been pressed down, the charging terminal 29a protrudes through the second opening portion 28a, and the charging terminal 29b protrudes through the second opening portion 28b. With reference to FIGS. 5 and 6, a description is given below of an example of the configuration in which the charging terminals 29a and 29b are caused to protrude.

FIG. 5 is a diagram showing an example of the internal configuration of the charging apparatus 3. Further, FIG. 6 is a diagram showing the directions in which the components shown in FIG. 5 are movable. In the exemplary embodiment, the first movable member 25 is provided rotatably about a shaft 25a placed inside the housing 21. Further, in the exemplary embodiment, a first abutment surface 25c that abuts a second movable member 31 described later is provided on the same side as the press-down surface 25b with respect to the shaft 25a. When the press-down surface 25b of the first movable member 25 has been pressed down (by the portable apparatus 2) (see an arrow (1) shown in FIG. 6), the first movable member 25 rotationally moves about the shaft 25a (see an arrow (2) shown in FIG. 6). At this time, the first movable member 25 rotates about the shaft 25a while changing the position in the first movable member 25 that abuts the second movable member 31 and the direction in which the first movable member 25 presses the second movable member 31, thereby moving the second movable member 31.

In addition, as shown in FIG. 5, the charging apparatus 3 includes the second movable member 31. The second movable member 31 is a supporting member that supports the charging terminals 29a and 29b. The second movable member 31 moves the charging terminals 29a and 29b in accordance with the movement of the first movable member 25. In the exemplary embodiment, the second movable member 31 is provided rotatably about a shaft 31a generally parallel to the shaft 25a. It should be noted that the second movable member 31 is placed inside the housing 21. In the exemplary embodiment, the second movable member 31 has an abutment portion 31b and a supporting portion 31c. The abutment portion 31b is formed so as to extend from the shaft 31a (so as to extend in an upward direction (a positive y-axis direction) in FIG. 5), and abuts the first abutment surface 25c of the first movable member 25. That is, the abutment portion 31b has at its end portion a second abutment surface that abuts the first abutment surface 25c.

The supporting portion 31c is formed so as to extend from the shaft 31a in a direction (a forward direction (a negative z-axis direction) in FIG. 5) different from that of the abutment portion 31b. In the exemplary embodiment, the supporting portion 31c is connected to the abutment portion 31b at one end thereof, and supports the charging terminals 29a and 29b at the other end. The charging terminals 29a and 29b are placed at such positions as to protrude through the second opening portions 28a and 28b, respectively. In other words, the charging terminals 29a and 29b are placed at such positions as to come into contact with the charge-receiving terminals 16a and 16b, respectively, of the portable apparatus 2 when mounted on the charging apparatus 3. The second movable member 31 is placed such that the distance between the two charging terminals 29a and 29b is almost the same as the distance between the two charge-receiving terminals 16a and 16b, thereby supporting the charging terminals 29a and 29b.

In the reference state, the second movable member 31 supports the charging terminals 29a and 29b while accommodating them in the housing 21 (see FIGS. 3 and 5). When, on the other hand, the first movable member 25 has been pressed down, the second movable member 31 moves the charging terminals 29a and 29b to the outside of the housing 21 through the second opening portions 28a and 28b, respectively. That is, when the abutment portion 31b has been pressed by the rotational movement of the first movable member 25 (see the arrow (2) shown in FIG. 6), the second movable member 31 rotationally moves about the shaft 31a (see an arrow (3) shown in FIG. 6). This causes the end portions (the charging terminals 29a and 29b) of the supporting portion 31c to move upward (see arrows (4) shown in FIG. 6), and causes the charging terminals 29a and 29b to protrude to the outside of the housing 21 through the second opening portions 28a and 28b, respectively (see arrows (5) shown in FIG. 6).

As described above, in the exemplary embodiment, when the portable apparatus 2 has been mounted on the charging apparatus 3, the first movable member 25 becomes pressed down, thereby causing the charging terminals 29a and 29b to protrude through the second opening portions 28a and 28b, respectively (see FIG. 4). Consequently, the protruding charging terminals 29a and 29b come into contact with (make connection to) the charge-receiving terminals 16a and 16b, respectively, of the portable apparatus 2, thereby enabling the charging apparatus 3 to charge the portable apparatus 2.

In addition, in the exemplary embodiment, the charging apparatus 3 includes a biasing member (the biasing member 35 shown in FIG. 10) that biases the second movable member 31. The biasing member 35 may have any specific configuration. In the exemplary embodiment, the biasing member 35 is, for example, a torsion spring attached around the shaft 31a.

The biasing member 35 biases the second movable member 31 in the direction in which the first movable member 25 comes closer to the reference state (see an arrow shown in FIG. 5). That is, the biasing member 35 biases the second movable member 31 so that the second movable member 31 presses the first movable member 25 so as to enter the reference state. Thus, in the exemplary embodiment, in the state where the portable apparatus 2 is not mounted on the charging apparatus 3, the first movable member 25 is maintained in the reference state by the biasing member 35. In the exemplary embodiment, it is possible to maintain the two movable members, namely the movable members 25 and 31, in the reference state with one biasing member. This makes it possible to simplify the structure of the charging apparatus 3.

Referring back to FIG. 3, the charging apparatus 3 includes the rotating members 26a and 26b. The rotating members 26a and 26b are used to determine the position where the portable apparatus 2 is connected to the charging apparatus 3. The rotating members 26a and 26b are provided such that at least parts of the rotating members 26a and 26b protrude to the outside of the housing 21 through third opening portions provided on a mounting surface on which the portable apparatus 2 is mounted (here, the bottom surface of the groove portion 23). In the exemplary embodiment, the rotating members 26a and 26b are provided such that parts (protruding portions) of the rotating members 26a and 26b protrude upward from the mounting surface. The protruding portions of the rotating members 26a and 26b are of such sizes as to be inserted into the holes 17a and 17b, respectively, of the portable apparatus 2.

The rotating members 26a and 26b are provided at positions corresponding to the holes 17a and 17b, respectively, of the portable apparatus 2. That is, the rotating members 26a and 26b are provided at such positions as to be inserted into the holes 17a and 17b, respectively, in the case where the portable apparatus 2 is correctly mounted on the charging apparatus 3. It should be noted that the case where the portable apparatus 2 is correctly mounted on the charging apparatus 3 refers to the case where the charging terminal 29a of the charging apparatus 3 is in contact with (connected to) the charge-receiving terminal 16a of the portable apparatus 2, and the charging terminal 29b of the charging apparatus 3 is in contact with (connected to) the charge-receiving terminal 16b of the portable apparatus 2. In this case, the protruding portion of the rotating member 26a is inserted into the hole 17a, and the protruding portion of the rotating member 26b is inserted into the hole 17b.

In the exemplary embodiment, each of the rotating members 26a and 26b is a rotatable wheel member (a rotatable wheel). Each of the rotating members 26a and 26b is rotatable in a predetermined direction. Here, the predetermined direction is (a horizontal direction and) a direction parallel to the supporting surface. In other words, the predetermined direction is the left-right direction of the portable apparatus 2 (the x-axis direction shown in FIG. 3) when the portable apparatus 2 is connected to the charging apparatus 3. The rotating members 26a and 26b may be rotating members rotatable at least in the predetermined direction. For example, in another embodiment, the rotating members 26a and 26b may be spherical bodies rotatably supported by spherical recessed portions.

It should be noted that in the exemplary embodiment, the number of the rotating members are two. Alternatively, the charging apparatus 3 may include only one rotating member, or may include three or more rotating members. It should be noted that in the portable apparatus 2, holes are formed at positions corresponding to the positions of the rotating members included in the charging apparatus 3 such that the number of the holes corresponds to the number of the rotating members.

[Operations Performed when Portable Apparatus is Mounted on Charging Apparatus]

Next, descriptions are given of the operations performed when the portable apparatus 2 is mounted on the charging apparatus 3. First, an operation will be described in which the portable apparatus 2 is positioned by the rotating members 26a and 26b relative to the charging apparatus 3 with respect to the left-right direction. Then, an operation will be described in which the charging terminals 29a and 29b protrude through the second opening portions 28a and 28b, respectively, in accordance with the mounting of the portable apparatus 2 on the charging apparatus 3.

(Positioning Operation by Rotating Members)

Figure 7:
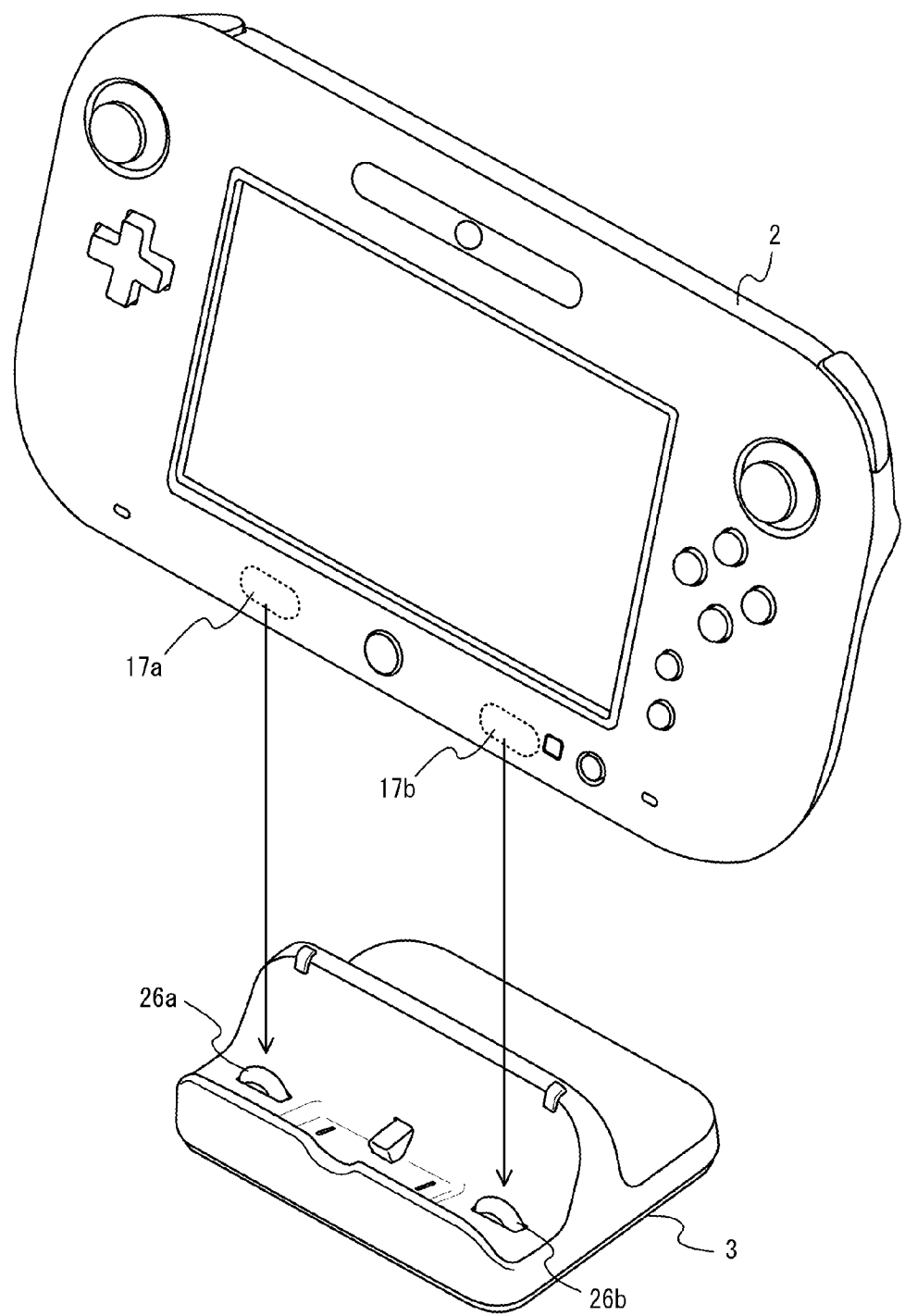
FIG. 7 is a diagram showing a non-limiting example of the operation of mounting the portable apparatus on the charging apparatus.

FIG. 7 is a diagram showing an example of the operation of mounting the portable apparatus 2 on the charging apparatus 3. To charge the portable apparatus 2, the user mounts the portable apparatus 2 on the charging apparatus 3, as shown in FIG. 7, by inserting the lower side portion of the portable apparatus 2 into the groove portion 23 of the charging apparatus 3. At this time, the portable apparatus 2 is mounted at such a position that the holes 17a and 17b are inserted into the rotating members 26a and 26b, respectively, of the charging apparatus 3.

Here, the groove portion 23 determines the position of the portable apparatus 2 at a correct position with respect to directions (an up-down (y-axis) direction and a depth (z-axis) direction) different from a predetermined direction (the left-right (x-axis) direction) in which the groove portion 23 extends. Meanwhile, the groove portion 23 cannot position the portable apparatus 2 at a correct position with respect to the predetermined direction. In the exemplary embodiment, however, it is possible to mount the portable apparatus 2 at a correct position by the rotating members 26a and 26b.

That is, if the portable apparatus 2 and the charging apparatus 3 do not have a correct positional relationship with each other with respect to the predetermined direction, the portable apparatus 2 is mounted by the rotating members 26a and 26b correcting the position of the portable apparatus 2. More specifically, if the holes 17a and 17b are shifted from the rotating members 26a and 26b with respect to the predetermined direction, the rotating members 26a and 26b come into contact with portions around the holes 17a and 17b, respectively. Accordingly, the rotating members 26a and 26b rotate to cause the portable apparatus 2 to move in a sliding manner in the predetermined direction. The movement of the portable apparatus 2 in a sliding manner results in the state where the protruding portions of the rotating members 26a and 26b are inserted in the holes 17a and 17b, respectively. This brings the charging terminals 29a and 29b of the charging apparatus 3 into contact with the charge-receiving terminals 16a and 16b, respectively, of the portable apparatus 2, thereby certainly charging the portable apparatus 2.

As described above, on the basis of the exemplary embodiment, even if the position of the portable apparatus 2 is slightly shifted relative to the charging apparatus 3, the portable apparatus 2 is mounted at a correct position by the rotating members 26a and 26b. This enables the user to easily connect the portable apparatus 2 to the charging apparatus 3 without mounting the portable apparatus 2 at an exact position.

It should be noted that in the exemplary embodiment, the two rotating members 26a and 26b are arranged in the predetermined direction. This brings the lower surface of the portable apparatus 2 into contact with the rotating members 26a and 26b. Thus, the portable apparatus 2 hardly comes into contact with the bottom surface of the charging apparatus 3, thereby enabling the portable apparatus 2 to move more smoothly. Further, the provision of slopes (depressed slopes) around the holes 17a and 17b of the portable apparatus 2 enables the portable apparatus 2 to move more smoothly.

(Operation of Causing Charging Terminals to Protrude in Accordance with Mounting of Portable Apparatus)

Next, the operation is described in which the charging terminals 29a and 29b protrude through the second opening portions 28a and 28b, respectively, in accordance with the mounting of the portable apparatus 2 on the charging apparatus 3. Here, in a method of causing the charging terminals 29a and 29b to protrude in accordance with the mounting of the portable apparatus 2, if the portable apparatus 2 is moved in a horizontal direction (a direction perpendicular to the direction of the mounting) before the portable apparatus 2 is completely mounted (that is, in the state where the charging terminals is slightly protruding), the charging terminals 29a and 29b may hit and become caught by the portable apparatus 2. If the charging terminals 29a and 29b become caught by the portable apparatus 2, the user has difficulty positioning the portable apparatus 2. This makes it difficult to easily mount the portable apparatus 2. It should be noted that if the amount of movement of each of the charging terminals 29a and 29b is large in the state where the portable apparatus 2 is close to the charging apparatus 3 (for example, the state where the first movable member 25 is slightly pressed down), there is a high possibility that the charging terminals 29a and 29b become caught by the portable apparatus 2.

In response, in the exemplary embodiment, the charging apparatus 3 is configured such that in the state where the amount of pressing down the first movable member 25 from the reference state is small, the amount of movement of each of the charging terminals 29a and 29b is small. This reduces the possibility that the charging terminals 29a and 29b become caught by the portable apparatus 2 when the portable apparatus 2 is mounted.

Figure 8:
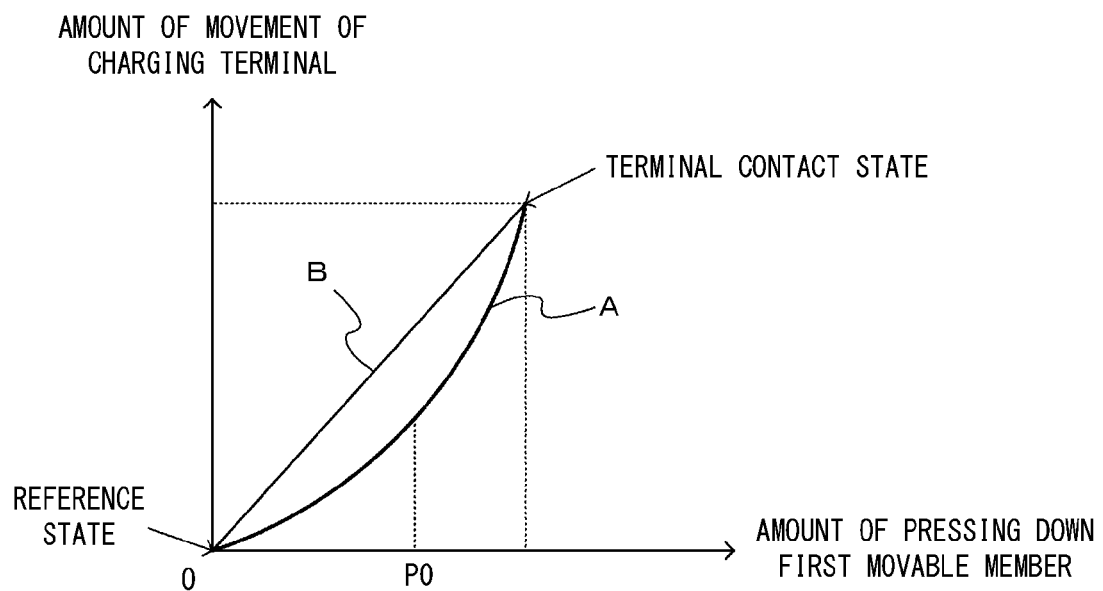
FIG. 8 is a diagram showing a non-limiting example of the relationship between the amount of pressing down the first movable member and the amount of movement of each of charging terminals.

FIG. 8 is a diagram showing an example of the relationship between the amount of pressing down the first movable member 25 and the amount of movement of each of the charging terminals 29a and 29b. It should be noted that in the exemplary embodiment, the amount of pressing down indicates the amount of pressing down the first movable member 25 from the reference state. Further, the amount of pressing down is a length in the moving direction of the portable apparatus 2. In other words, the amount of pressing down corresponds to the amount of movement of the portable apparatus 2. Further, the amount of movement of each of the charging terminals 29a and 29b (referred to as a "terminal movement amount") is the amount of movement of each of the charging terminals 29a and 29b from the reference state.

In addition, in the graph shown in FIG. 8, a curve A represents the relationship between the amount of pressing down and the terminal movement amount in the exemplary embodiment. Further, a straight line B represents the relationship between the amount of pressing down and the terminal movement amount in the case where the terminal movement amount is proportional to the amount of pressing down. The graph shown in FIG. 8 represents the relationship between the amount of pressing down and the terminal movement amount during the period from the reference state to a terminal contact state. It should be noted that the terminal contact state refers to the state where the charging terminals 29a and 29b can come into contact with the charge-receiving terminals 16a and 16b, respectively, of the portable apparatus 2, and also refers to the state where the opposing terminals are in contact with each other when the portable apparatus 2 is mounted on the charging apparatus 3 (here, the state immediately after the contact).

As shown in FIG. 8, in the exemplary embodiment, the terminal movement amount (the curve A) during the period from the reference state to a predetermined intermediate state is smaller than the terminal movement amount (the straight line B) during the same period in the case where the terminal movement amount is proportional to the amount of pressing down. It should be noted that the intermediate state refers to a state before the terminal contact state. Referring to FIG. 8, the amount of movement of the curve A and the amount of movement of the straight line B are equal to each other in the terminal contact state, and therefore, the intermediate state is a given state before the terminal contact state. As described above, on the basis of the exemplary embodiment, the charging terminals 29a and 29b do not protrude much during the period from the reference state to the predetermined intermediate state. This makes it possible to reduce the possibility that the charging terminals 29a and 29b become caught by the portable apparatus 2. It should be noted that in the exemplary embodiment, the portable apparatus 2 can slide in the left-right direction, and therefore, the user may inadvertently move the portable apparatus 2 in the left-right direction when mounting the portable apparatus 2. Thus, it is effective, as described above, to reduce the possibility that the charging terminals 29a and 29b become caught.

In addition, as shown in FIG. 8, in the exemplary embodiment, during the period from the reference state to a predetermined state (the state where the amount of pressing down is P0), the amount of movement of each of the charging terminals 29a and 29b per unit amount of pressing down the first movable member 25 (the slope of the curve A) is smaller than the amount of movement of each of the charging terminals 29a and 29b per unit amount of pressing down the first movable member 25 in the case where the terminal movement amount is proportional to the amount of pressing down (the slope of the straight line B). In other words, in the exemplary embodiment, the amount of movement of each of the charging terminals 29a and 29b per unit amount of pressing down the first movable member 25 is larger in a predetermined state where the amount of pressing down the first movable member 25 from the reference state is relatively large, than in the state where the amount of pressing down the first movable member 25 from the reference state is relatively small. Thus, in the exemplary embodiment, the change in the terminal movement amount is small in the state where the first movable member 25 is starting to be pressed down; and the change in the terminal movement amount is great in the state where the first movable member 25 is deeply pressed down. This makes it possible to reduce the possibility that the charging terminals 29a and 29b become caught in the state where the first movable member 25 is starting to be pressed down, and also possible to cause the charging terminals 29a and 29b to protrude sufficiently. Thus, it is possible to certainly charge the portable apparatus 2.

With reference to FIGS. 9 through 18, descriptions are given in detail below of the operations performed when the portable apparatus 2 is mounted on the charging apparatus 3. It should be noted that in the following descriptions, each of FIGS. 9, 11, 13, 15, and 17 is a cross-sectional view of the charging apparatus 3 in a plane passing through the second opening portions 28a and 28b and parallel to the xy plane, the cross-sectional view seen from the front (from the negative z-axis direction). Further, each of FIGS. 10, 12, 14, 16, and 18 is a cross-sectional view in a plane passing through the first movable member 25 and parallel to the yz plane, the cross-sectional view seen from the right (from the positive x-axis direction). It should be noted that in FIGS. 9 through 18, the components unrelated to the descriptions are appropriately omitted in order to make the figures readily understandable. Further, among the components provided in the charging apparatus 3 on both left and right sides, the components on the left side (on the negative x-axis direction side) are described below; however, also the components on the right side operate in a similar manner.

Figure 9:
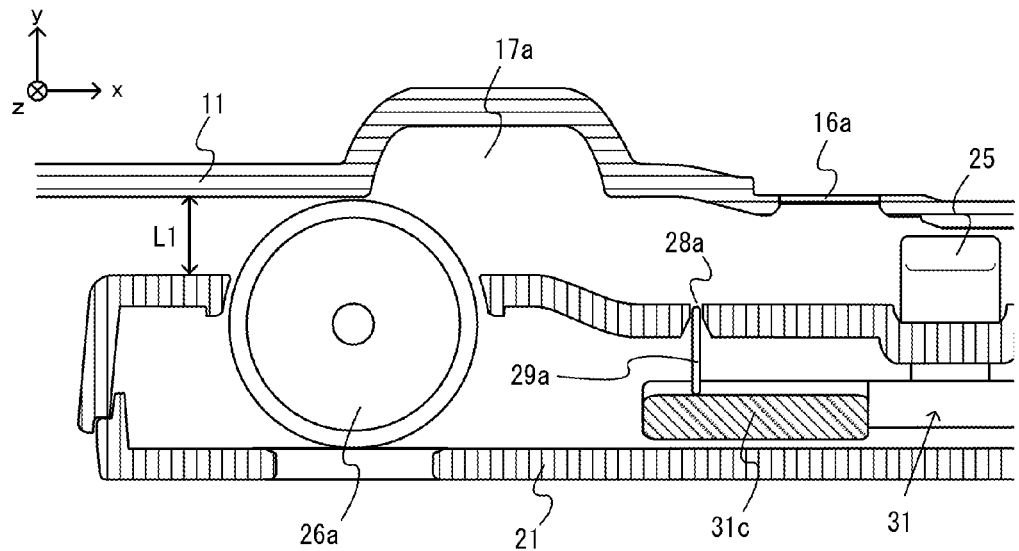
FIG. 9 is a diagram showing non-limiting examples of the components of the charging apparatus in an apparatus contact state.
Figure 10:
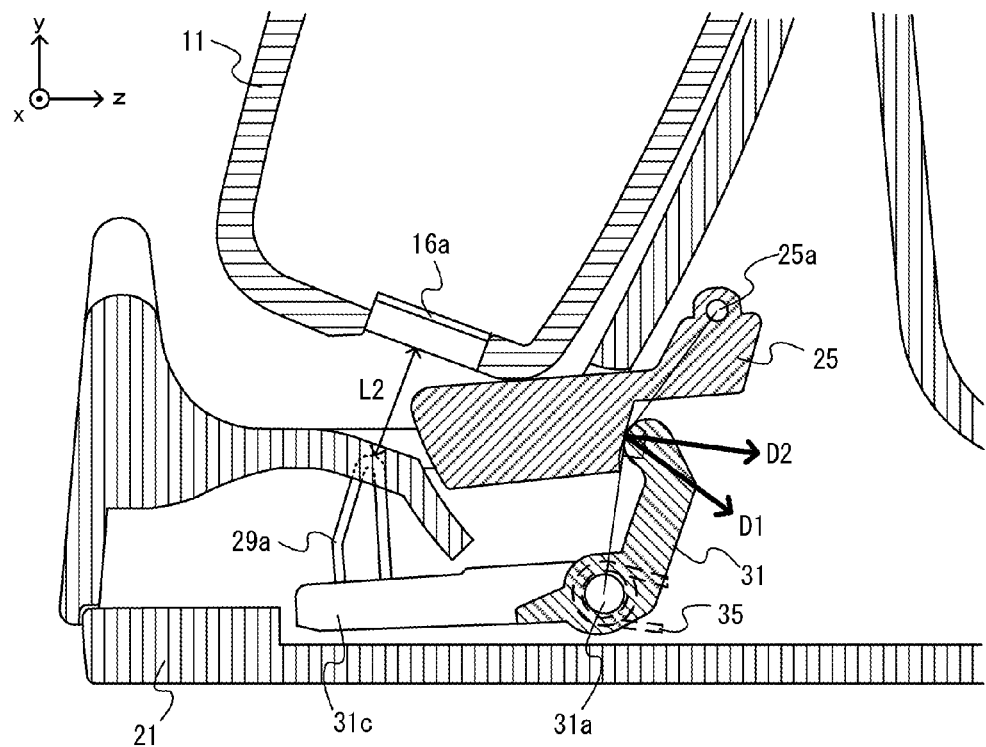
FIG. 10 is a diagram showing non-limiting examples of the components of the charging apparatus in the apparatus contact state.

FIGS. 9 and 10 are diagrams showing the components of the charging apparatus 3 in the state (referred to as an "apparatus contact state") immediately after the portable apparatus 2 has come into contact with the first movable member 25. The apparatus contact state refers to the state where the positions of the portable apparatus 2 and the charging apparatus 3 with respect to the left-right direction do not coincide with each other. That is, in this state, the rotating member 26a is not inserted in the hole 17a of the portable apparatus 2, and the first movable member 25 is not pressed down. It should be noted that in FIG. 10, it is assumed that the portable apparatus 2 is in contact with the first movable member 25, but is not pressing down the first movable member 25 (the amount of pressing down the first movable member 25 is 0, that is, the first movable member 25 is in the reference state).

As shown in FIG. 9, in the exemplary embodiment, the portable apparatus 2 and the charging apparatus 3 are configured such that in the state where the rotating members 26a and 26b are not inserted in the holes 17a and 17b, respectively, of the portable apparatus 2, the portable apparatus 2 does not move (press down) the first movable member 25. Consequently, the charging terminals 29a and 29b do not protrude in the state where the positions of the charging terminals 29a and 29b of the charging apparatus 3 and the positions of the charge-receiving terminals 16a and 16b of the portable apparatus 2 do not coincide with each other. This makes it possible to reduce the possibility that the charging terminals 29a and 29b come into contact with (become caught by) portions other than the charge-receiving terminals 16a and 16b of the portable apparatus 2.

It should be noted that in the exemplary embodiment, the rotating members 26a and 26b are provided so as to protrude beyond the first movable member 25 with respect to a predetermined reference plane (see FIG. 9). It should be noted that the predetermined reference plane refers to a plane generally perpendicular to the direction of pressing down the first movable member 25 (here, the y-axis direction). This makes it likely that the portable apparatus 2 comes into contact with the rotating members 26a and 26b before with the first movable member 25 when the portable apparatus 2 is mounted on the charging apparatus 3. This makes it possible to reduce the possibility that the first movable member 25 becomes pressed down in the state where the rotating members 26a and 26b are not inserted in the holes 17a and 17b, respectively, of the portable apparatus 2.

In addition, in the exemplary embodiment, a plurality of (two) rotating members are provided, and the first movable member 25 is provided so as to protrude through the first opening portion 24 formed at a position between the two rotating members 26a and 26b, and so as not to protrude beyond a line segment connecting the extremity portions of the two rotating members 26a and 26b. This makes it possible to more certainly prevent the first movable member 25 from being pressed down in the state where the rotating member 26a is not inserted in the hole 17a of the portable apparatus 2.

In addition, in the exemplary embodiment, the housing 21 supports the portable apparatus 2 by tilting it in a predetermined direction (the positive z-axis direction), and the first opening portion 24 is provided further in the predetermined direction than the second opening portions 28a and 28b (see FIG. 3). Thus, the distance between the portable apparatus 2 and the second opening portions 28a and 28b increases in the state where the portable apparatus 2 is starting to press down the first movable member 25. This makes it possible to further reduce the possibility that the charging terminals 29a and 29b become caught by the portable apparatus 2.

It should be noted that the first movable member 25 and the second movable member 31 may be configured such that even if the first movable member 25 is pressed down by the portable apparatus 2 in the state where the rotating members 26a and 26b are not inserted in the holes 17a and 17b, respectively, of the portable apparatus 2, the charging terminals 29a and 29b are accommodated in the housing 21 in this state. Similarly to the above, this also makes it possible to reduce the possibility that the charging terminals 29a and 29b come into contact with (become caught by) portions other than the charge-receiving terminals 16a and 16b of the portable apparatus 2.

Figure 11:
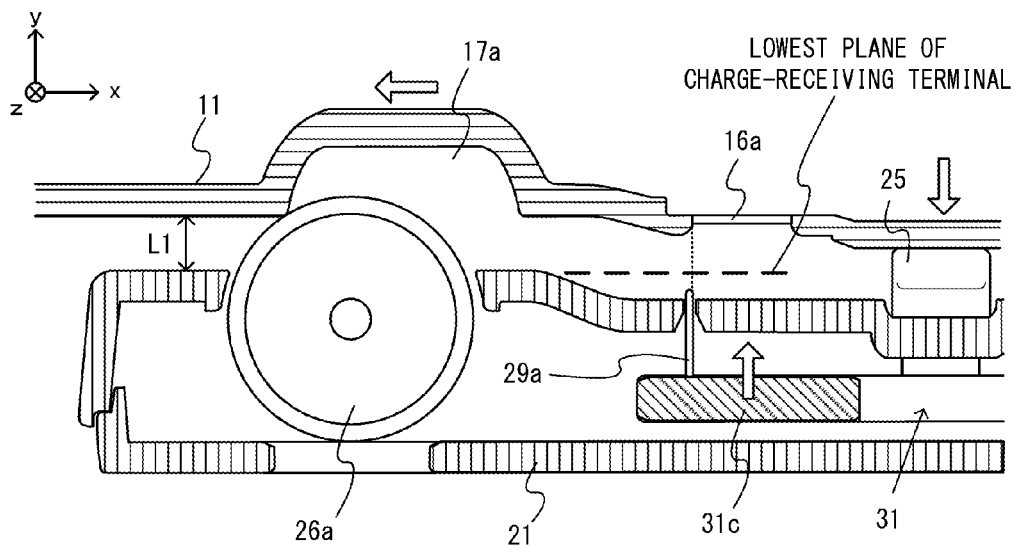
FIG. 11 is a diagram showing non-limiting examples of the components of the charging apparatus in an early pressed-down state.
Figure 12:
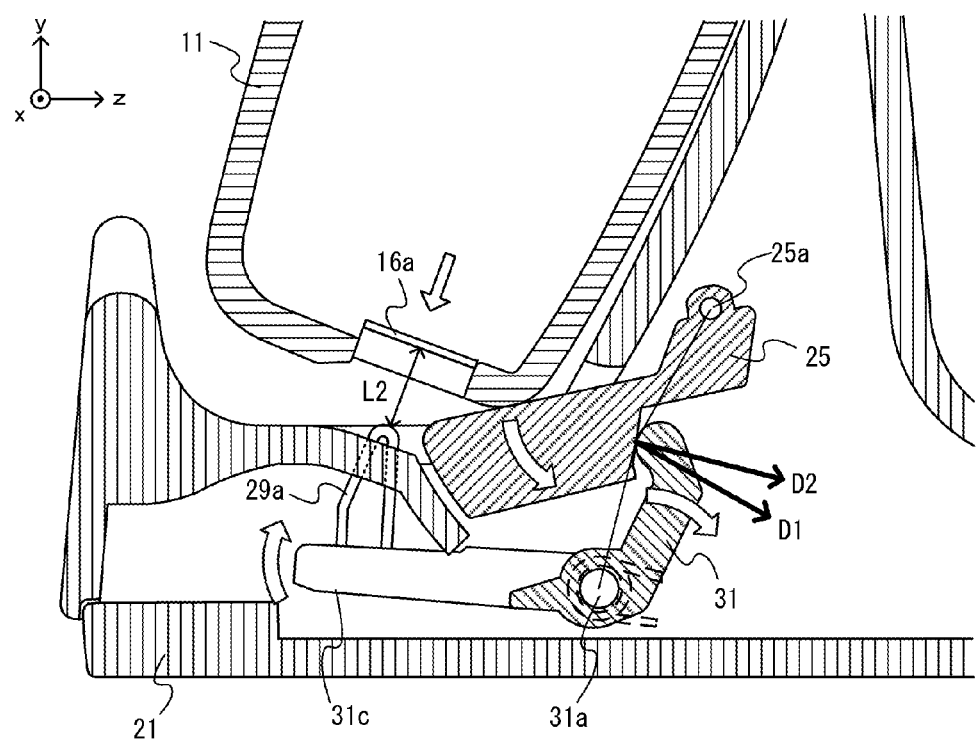
FIG. 12 is a diagram showing non-limiting examples of the components of the charging apparatus in the early pressed-down state.

FIGS. 11 and 12 are diagrams showing the components of the charging apparatus 3 in the state (referred to as an "early pressed-down state") where the first movable member 25 is slightly pressed down from the apparatus contact state. As shown in FIG. 11, in the early pressed-down state, the above positioning operation performed by the rotating members 26a and 26b causes the hole 17a of the portable apparatus 2 to move in the direction of being inserted into the rotating member 26a, and causes the protruding portion of the rotating member 26a to start to be inserted into the hole 17a. This causes the portable apparatus 2 to move slightly downward from the state shown in FIGS. 9 and 10, and causes the first movable member 25 to be slightly pressed down by the portable apparatus 2. As a result, as shown in FIG. 12, the second movable member 31 rotates, and the charging terminal 29a moves upward.

In the early pressed-down state, as shown in FIG. 11, the charge-receiving terminal 16a is not located above the corresponding charging terminal 29a. At this time, the charging terminal 29a is located below the lowest plane of the charge-receiving terminal 16a (see a dotted line shown in FIG. 11). It should be noted that the lowest plane of the charge-receiving terminal 16a refers to the plane on which the charge-receiving terminal 16a is located in the state where the portable apparatus 2 is mounted at a correct position. Thus, in the exemplary embodiment, the first movable member 25 and the second movable member 31 are configured such that in the state where the positions of the charge-receiving terminals 16a and 16b and the positions of the charging terminals 29a and 29b do not coincide with each other, the charging terminals 29a and 29b are located below the lowest planes of the charge-receiving terminals 16a and 16b, respectively. This makes it possible to reduce the possibility that the charging terminals 29a and 29b come into contact with portions other than the charge-receiving terminals 16a and 16b of the portable apparatus 2 in the state where the positions of the charge-receiving terminals 16a and 16b and the positions of the charging terminals 29a and 29b do not coincide with each other. Thus, it is possible to reduce the possibility that the charging terminals 29a and 29b become caught.

Figure 13:
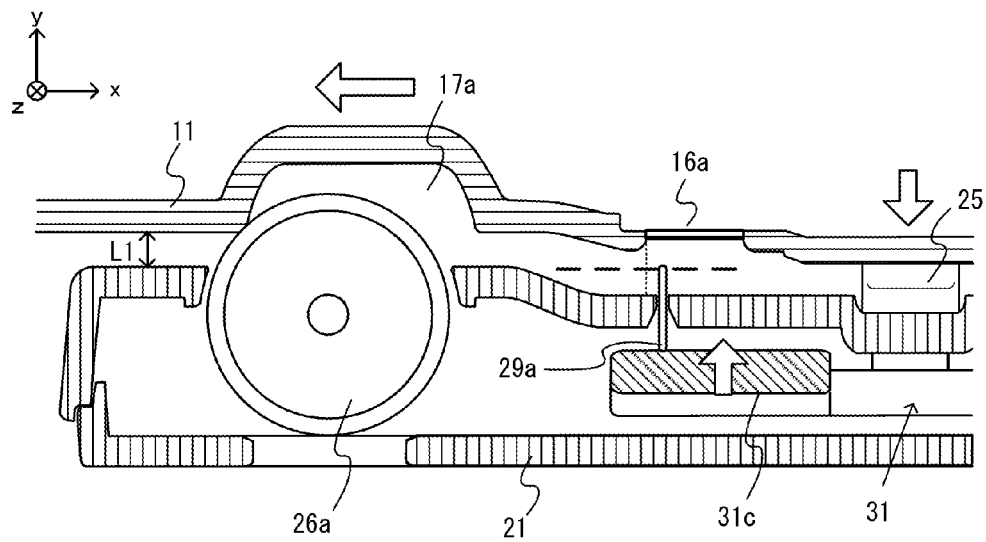
FIG. 13 is a diagram showing non-limiting examples of the components of the charging apparatus in a middle pressed-down state.
Figure 14:
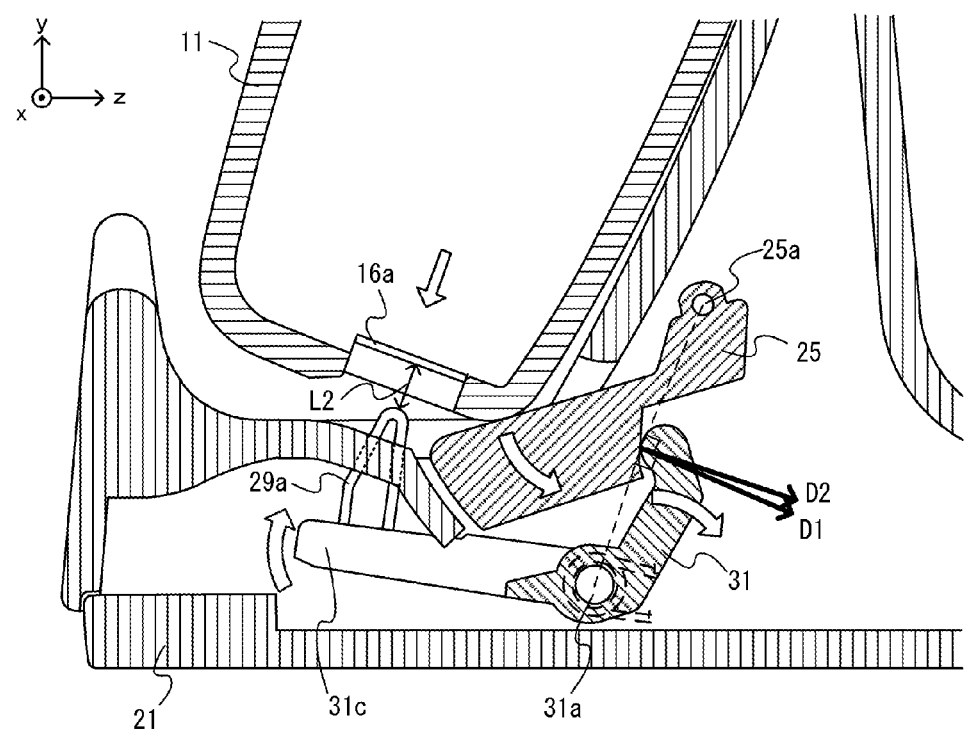
FIG. 14 is a diagram showing non-limiting examples of the components of the charging apparatus in the middle pressed-down state.

FIGS. 13 and 14 are diagrams showing the components of the charging apparatus 3 in the state (referred to as a "middle pressed-down state") where the first movable member 25 is slightly pressed down further from the early pressed-down state shown in FIGS. 11 and 12. As shown in FIG. 13, in the middle pressed-down state, the above positioning operation performed by the rotating members 26a and 26b causes the hole 17a of the portable apparatus 2 to move further from the early pressed-down state in the direction of being inserted into the rotating member 26a, and causes the protruding portion of the rotating member 26a to be inserted further into the hole 17a. This causes the portable apparatus 2 to move further downward from the early pressed-down state, and causes the first movable member 25 to be further pressed down by the portable apparatus 2. As a result, as shown in FIG. 14, the second movable member 31 rotates further, and the charging terminal 29a moves further upward.

It should be noted that in the middle pressed-down state, as shown in FIG. 13, the charge-receiving terminal 16a is located above the corresponding charging terminal 29a, and the charging terminal 29a is located at such a position as to protrude beyond the lowest plane of the charge-receiving terminal 16a described above. Thus, on the basis of the exemplary embodiment, it is possible to more certainly bring the charging terminals 29a and 29b into contact with the charge-receiving terminals 16a and 16b, respectively.

Here, in the exemplary embodiment, the proportion of the terminal movement amount to the amount of pressing down the first movable member 25 is larger in the state where the amount of pressing down the first movable member 25 is relatively large (during the change from the early pressed-down state to the middle pressed-down state), than in the state where the amount of pressing down the first movable member 25 is relatively small (during the change from the reference state to the early pressed-down state). That is, in the exemplary embodiment, the charging apparatus 3 has a "configuration in which the amount of movement of each of the charging terminals 29a and 29b is relatively small at the start of pressing the first movable member 25". Thus, as described above, it is possible to reduce the possibility that the charging terminals 29a and 29b become caught by the portable apparatus 2.

Here, as shown in FIG. 10, in the apparatus contact state, the angular difference between a moving direction D1 of the part of the first movable member 25 (a first abutment part) that abuts the second movable member 31 and a moving direction D2 of the part of the second movable member 31 (a second abutment part) that abuts the first movable member 25 is relatively great. In contrast, as shown in FIGS. 12 and 14, the angular difference between the two moving directions D1 and D2 gradually decreases as the amount of pressing down the first movable member 25 increases. As described above, in the exemplary embodiment, the first movable member 25 and the second movable member 31 are configured such that the angular difference between the moving direction of the first abutment part and the moving direction of the second abutment part is smaller in the state where the amount of pressing down the first movable member 25 from the reference state is large, than in the state where the amount of pressing down the first movable member 25 from the reference state is small. It should be noted that, to achieve such a configuration, for example, the first movable member 25 and the second movable member 31 are arranged such that the larger the amount of pressing down, the closer the angle between two line segments, namely a first line segment connecting the center of the shaft 25a of the first movable member 25 with the first abutment part and a second line segment connecting the center of the shaft 31a of the second movable member 31 with the second abutment part, is to 180°.

As described above, on the basis of the configuration in which the angular difference decreases with an increase in the amount of pressing down, the direction in which the first movable member 25 presses down the second movable member 31 changes so as to come closer to the moving direction of the second movable member 31. Consequently, in the state where the amount of pressing down is small, the amount of movement of the second movable member 31 is smaller than the amount of movement of the first movable member 25. As a result, the terminal movement amount of the charging terminals 29a and 29b is relatively small. On the other hand, in the state where the amount of pressing down is large, the amount of movement of the second movable member 31 is larger than the amount of movement of the first movable member 25. As a result, the terminal movement amount of the charging terminals 29a and 29b is relatively large. Thus, with the configuration in which the angular difference decreases with an increase in the amount of pressing down, it is possible to achieve the above "configuration in which the amount of movement of each of the charging terminals 29a and 29b is relatively small at the start of pressing the first movable member 25".

In addition, as shown in FIG. 10, it can be said that the ratio of the component of the direction that contributes to the movement of the second movable member 31 to (the entire component of) the moving direction D1 of the first abutment part of the first movable member 25 is relatively low. In contrast, as shown in FIGS. 12 and 14, it can be said that the above ratio increases with an increase in the amount of pressing down. That is, in the exemplary embodiment, the first movable member 25 and the second movable member 31 are configured such that the above ratio is higher in the state where the amount of pressing down the first movable member 25 from the reference state is large, than in the state where the amount of pressing down the first movable member 25 from the reference state is small. With such a configuration, it is possible to achieve the above "configuration in which the amount of movement of each of the charging terminals 29a and 29b is relatively small at the start of pressing the first movable member 25".

It should be noted that it is possible to achieve the above configuration in which the angular difference decreases (the above ratio increases) with an increase in the amount of pressing down, by providing at least one of the first movable member 25 and the second movable member 31 so as to be rotationally movable. Thus, in another embodiment, the above configuration may be achieved by providing either one of the first movable member 25 and the second movable member 31 so as to be rotationally movable.

Figure 15:
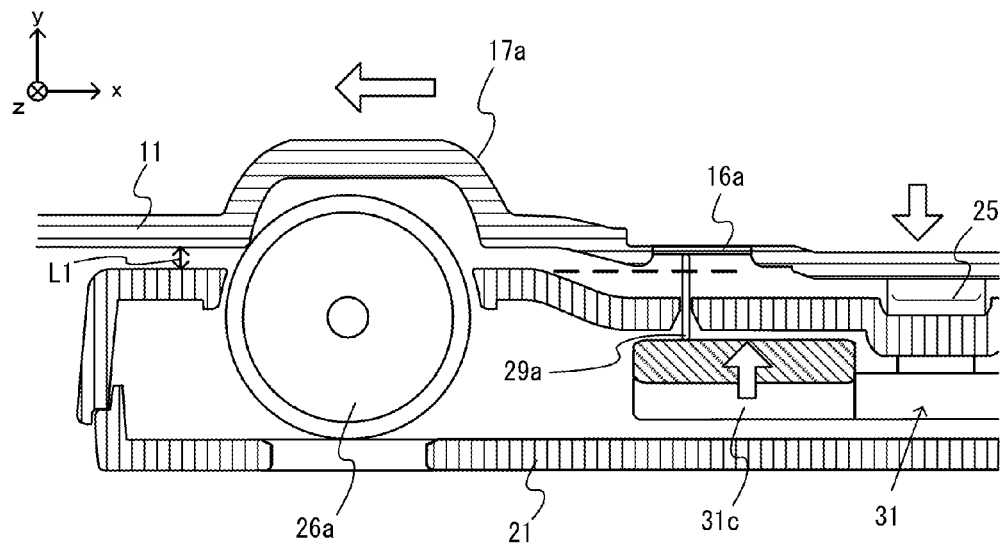
FIG. 15 is a diagram showing non-limiting examples of the components of the charging apparatus in a terminal contact state.
Figure 16:
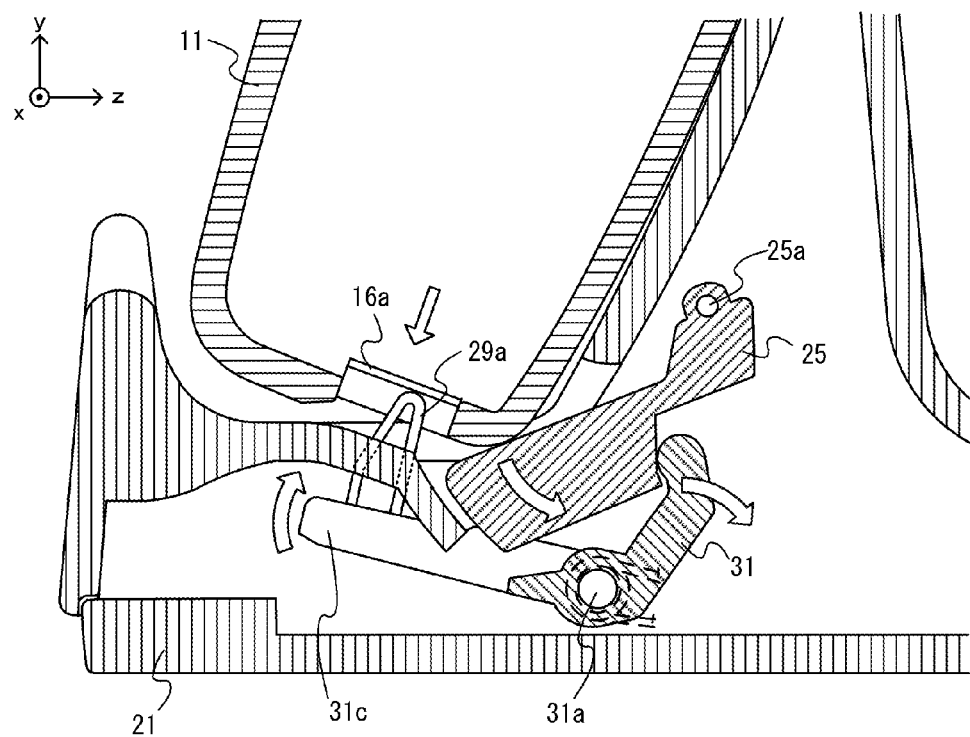
FIG. 16 is a diagram showing non-limiting examples of the components of the charging apparatus in the terminal contact state.

FIGS. 15 and 16 are diagrams showing the components of the charging apparatus 3 in the terminal contact state. As shown in FIG. 15, in the terminal contact state, the above positioning operation performed by the rotating members 26a and 26b causes the hole 17a of the portable apparatus 2 to move further from the middle pressed-down state in the direction of being inserted into the rotating member 26a, and causes the protruding portion of the rotating member 26a to be inserted further into the hole 17a. This causes the portable apparatus 2 to move further downward from the middle pressed-down state, and causes the first movable member 25 to be further pressed down by the portable apparatus 2. As a result, as shown in FIG. 16, the second movable member 31 rotates further, and the charging terminal 29a moves further upward. This brings the charging terminal 29a into contact with the charge-receiving terminal 16a. As described above, in the exemplary embodiment, the charging terminal 29a becomes located below the charge-receiving terminal 16a, and then protrudes beyond the lowest plane of the charge-receiving terminal 16a. This makes it possible to certainly bring the charging terminal 29a into contact with the charge-receiving terminal 16a, so that the charging terminal 29a does not come into contact with and become caught by a portion other than the charge-receiving terminal 16a of the portable apparatus 2.

Figure 17:
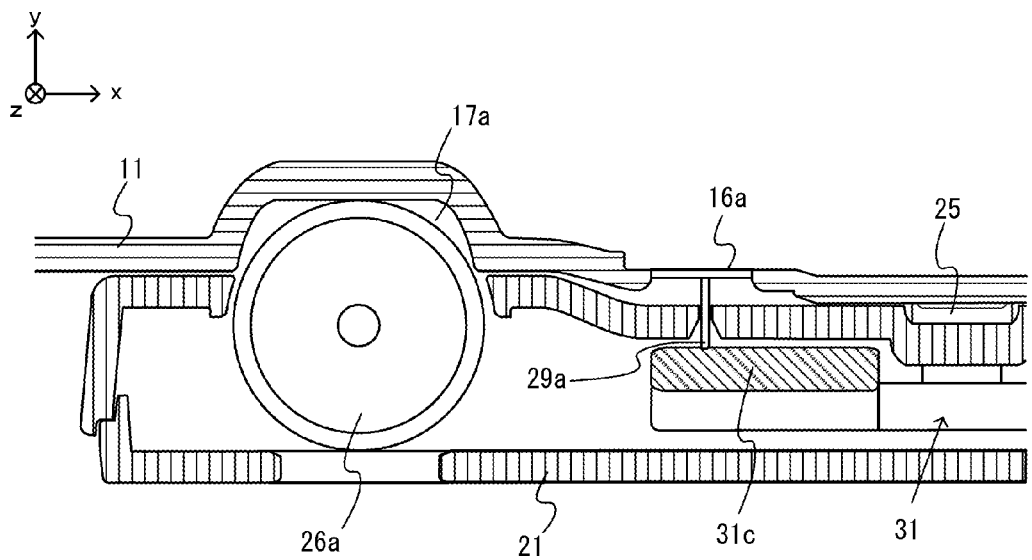
FIG. 17 is a diagram showing non-limiting examples of the components of the charging apparatus in a mounted state.
Figure 18:
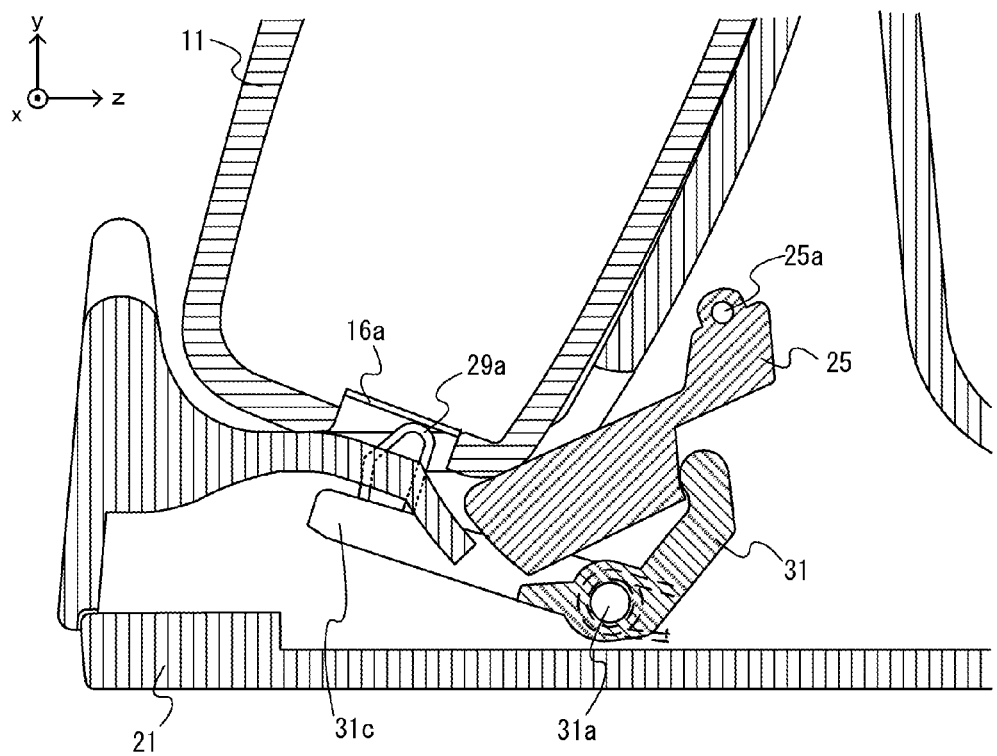
FIG. 18 is a diagram showing non-limiting examples of the components of the charging apparatus in the mounted state.

FIGS. 17 and 18 are diagrams showing the state (referred to as a "mounted state") where the portable apparatus 2 is mounted. As shown in FIG. 17, in the mounted state, the above positioning operation performed by the rotating members 26a and 26b causes the entirety of the protruding portion of the rotating member 26a to be inserted into the hole 17a. This stably maintains the position of the portable apparatus 2 relative to the charging apparatus 3. It should be noted that in the terminal contact state, the opposing terminals come into contact with each other, and in the mounted state, the distance between the charge-receiving terminals 16a and 16b and the supporting portion 31c becomes smaller. Thus, as shown in FIG. 18, the charging terminals 29a and 29b are deformed, and therefore, the restoring forces of the charging terminals 29a and 29b make it possible to certainly bring the opposing terminals into contact with each other. It should be noted that in another embodiment, the first movable member 25 and/or the second movable member 31 may be configured to deform, or the charge-receiving terminals 16a and 16b may be configured to move into the housing 11 of the portable apparatus 2. Also the restoring forces based on these configurations can certainly bring the opposing terminals into contact with each other.

As described above, in the exemplary embodiment, the first movable member 25 and the second movable member 31 are configured such that the amount of movement of the second movable member 31 per unit amount of movement of the first movable member 25 is larger in a predetermined second state where the amount of pressing down the first movable member 25 from the reference state is relatively large (for example, during the change from the early pressed-down state to the middle pressed-down state), than in a predetermined first state where the amount of pressing down the first movable member 25 from the reference state is relatively small (for example, during the change from the reference state to the early pressed-down state). This makes it possible to reduce the possibility that the charging terminals 29a and 29b become caught by the portable apparatus 2.

In addition, in the exemplary embodiment, the angular difference between the moving direction of the portable apparatus 2 (the direction of pressing down the first movable member 25) and the moving direction of the portion of the first movable member 25 (the press-down surface) that abuts the portable apparatus 2 increases with an increase in the amount of pressing down the first movable member 25. That is, the first movable member 25 is configured such that the amount of rotation of the first movable member 25 per unit amount of pressing down the first movable member 25 is larger in the second state than in the first state. This also makes it possible to reduce the possibility that the charging terminals 29a and 29b become caught by the portable apparatus 2.

It should be noted that in the exemplary embodiment, the charging apparatus 3 is configured such that both (a) the amount of rotation (the amount of movement) of the first movable member 25 per unit amount of pressing down the first movable member 25 and (b) the amount of movement of the second movable member 31 per unit amount of movement of the first movable member 25 are larger in the second state than in the first state. Here, in another embodiment, the charging apparatus 3 may be configured such that either one of the above (a) and (b) is larger in the second state than in the first state. This also makes it possible to make the change in the terminal movement amount of the charging terminals 29a and 29b relatively smaller in the state where the first movable member 25 is starting to be pressed down (than in the subsequent state). Thus, it is possible to reduce the possibility that the charging terminals 29a and 29b become caught by the portable apparatus 2.

[Variations]

Figure 19:
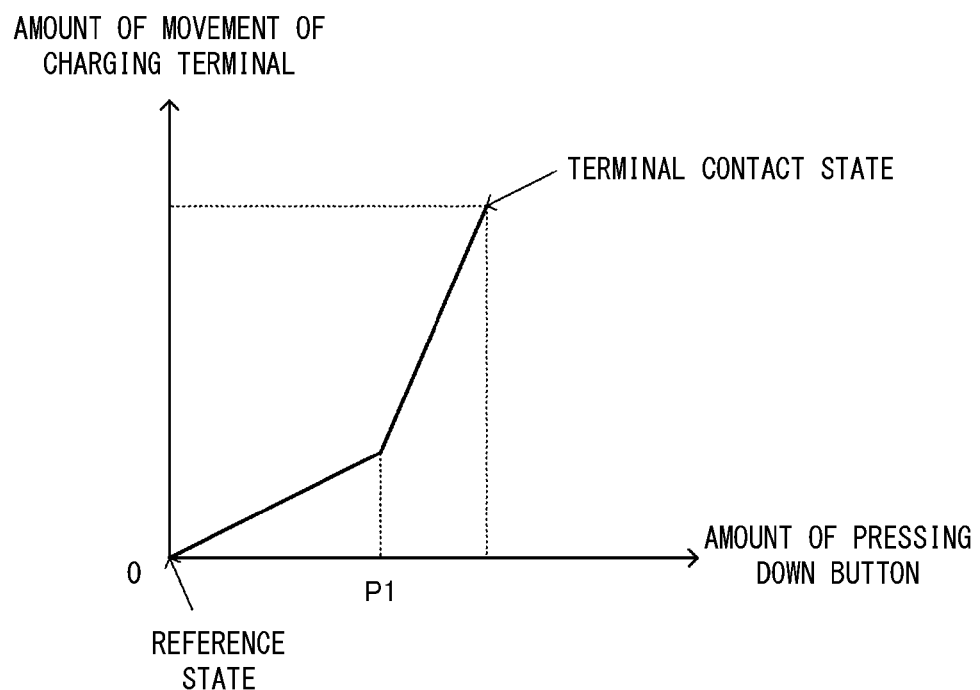
FIG. 19 is a diagram showing a non-limiting example of the relationship between the amount of pressing down a first movable member and the amount of movement of each of charging terminals in another embodiment.

The above embodiment is described taking as an example the form in which the proportion of the amount of movement of each of the charging terminals 29a and 29b to the amount of pressing down the first movable member 25 (the slope of the change in the terminal movement amount) changes continuously (see FIG. 8). Here, in another embodiment, the above proportion may change in a stepwise manner. FIG. 19 is a diagram showing an example of the relationship between the amount of pressing down a first movable member and the terminal movement amount of charging terminals in another embodiment. In the example shown in FIG. 19, the slope of the change in the amount of movement from the reference state (the apparatus contact state) to the state where the amount of pressing down is P1 is constant, and the slope from the state where the amount of pressing down is P1 to the terminal contact state is constant. Further, the slope from the reference state to the state where the amount of pressing down is P1 is smaller than the slope from the state where the amount of pressing down is P1 to the terminal contact state. Similarly to the above embodiment, also in the case where the slope changes in a stepwise manner, it is possible to reduce the possibility that the charging terminals 29a and 29b become caught by the portable apparatus 2.

Figure 20:
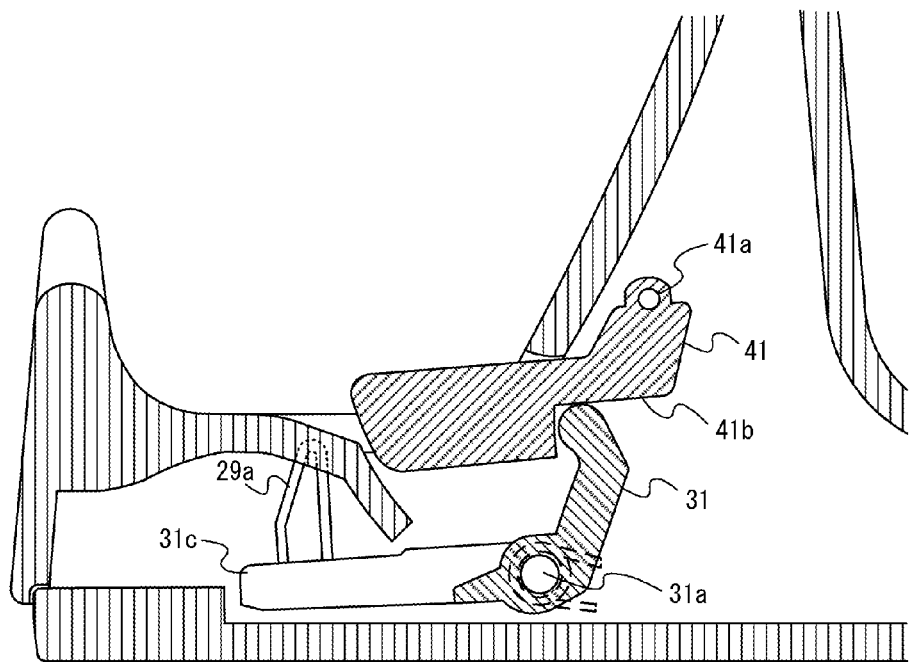
FIG. 20 is a diagram showing non-limiting examples of the configurations of the first movable member and a second movable member according to the other embodiment.
Figure 21:
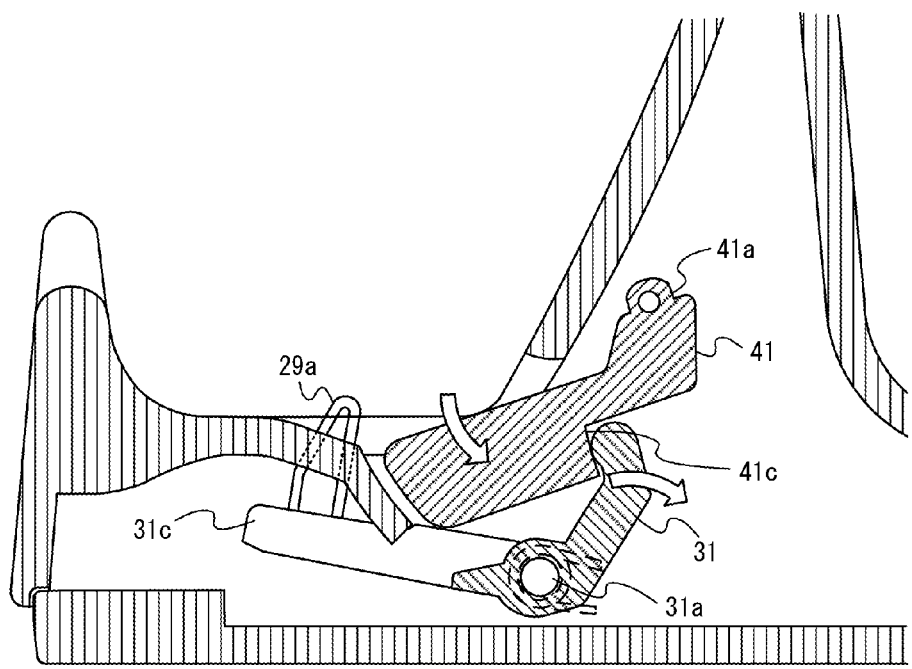
FIG. 21 is a diagram showing non-limiting examples of the configurations of the first movable member and the second movable member according to the other embodiment.

It should be noted that the configuration in which the slope of the change in the terminal movement amount changes in a stepwise manner may be, for example, the configuration in which the positions in (the abutment surfaces of) a first movable member that abut a second movable member change discontinuously between the reference state and the terminal contact state. FIGS. 20 and 21 are diagrams showing examples of the configurations of the first movable member and the second movable member. In FIGS. 20 and 21, a first movable member 41 is rotatable about a shaft 41a. The first movable member 41 has two abutment portions (abutment surfaces) 41b and 41c. It should be noted that a second movable member 31 is similar to that according to the above embodiment. In FIG. 20, in the reference state, the abutment portion 41b abuts the second movable member 31. Then, the first movable member 41 becomes pressed down to rotate. After the amount of pressing down exceeds the amount of pressing down P1, as shown in FIG. 21, the abutment portion 41c abuts the second movable member 31. The abutment portions that abut the second movable member 31 thus change, which makes it possible to change the above slope in a stepwise manner. It should be noted that the example shown in FIGS. 20 and 21 is an example of the configuration in which the above slope is changed in a stepwise manner. In this case, the slope from the reference state to the state where the amount of pressing down is P1 may or may not be constant. Further, also the slope from the state where the amount of pressing down is P1 to the terminal contact state may or may not be constant.

Figure 22:
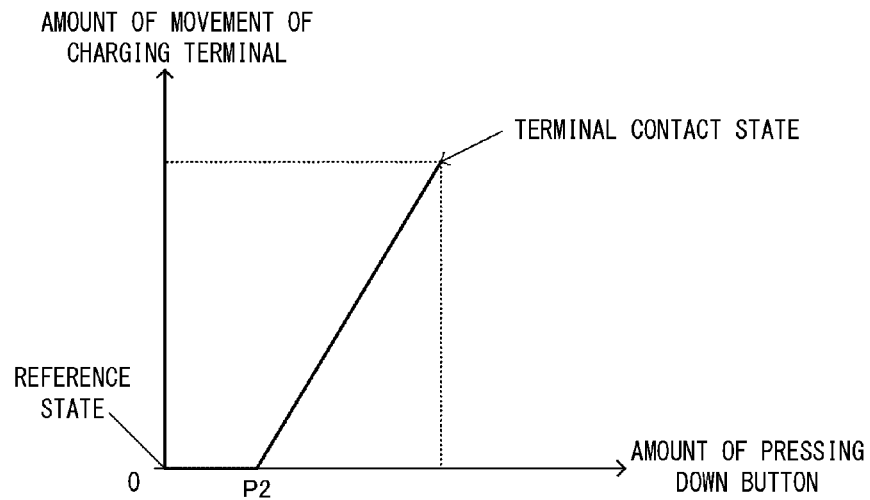
FIG. 22 is a diagram showing a non-limiting example of the relationship between the amount of pressing down a first movable member and the amount of movement of each of charging terminals according to another embodiment.

In addition, the above embodiment is described taking as an example the form in which, when the first movable member 25 has been pressed down from the reference state (the apparatus contact state), the charging terminals 29a and 29b start moving. Here, in another embodiment, the charging terminals 29a and 29b may be configured not to move during the period from the reference state (the apparatus contact state) to the state where the first movable member 25 is pressed down by a predetermined amount of pressing down. FIG. 22 is a diagram showing an example of the relationship between the amount of pressing down a first movable member and the amount of movement of each of charging terminals according to another embodiment. As shown in FIG. 22, the proportion of the slope of the change in the terminal movement amount is 0 from the reference state to the state where the amount of pressing down is P2. It should be noted that in FIG. 22, it is assumed that the slope during the period from the state where the amount of pressing down is P2 to the terminal contact state is constant. Alternatively, the slope during the same period may gradually increase in accordance with the amount of pressing down. Similarly to the above embodiment, also in the case where the charging terminals 29a and 29b do not move in a predetermined period from the reference state, it is possible to reduce the possibility that the charging terminals 29a and 29b become caught by the portable apparatus 2.

Figure 23:
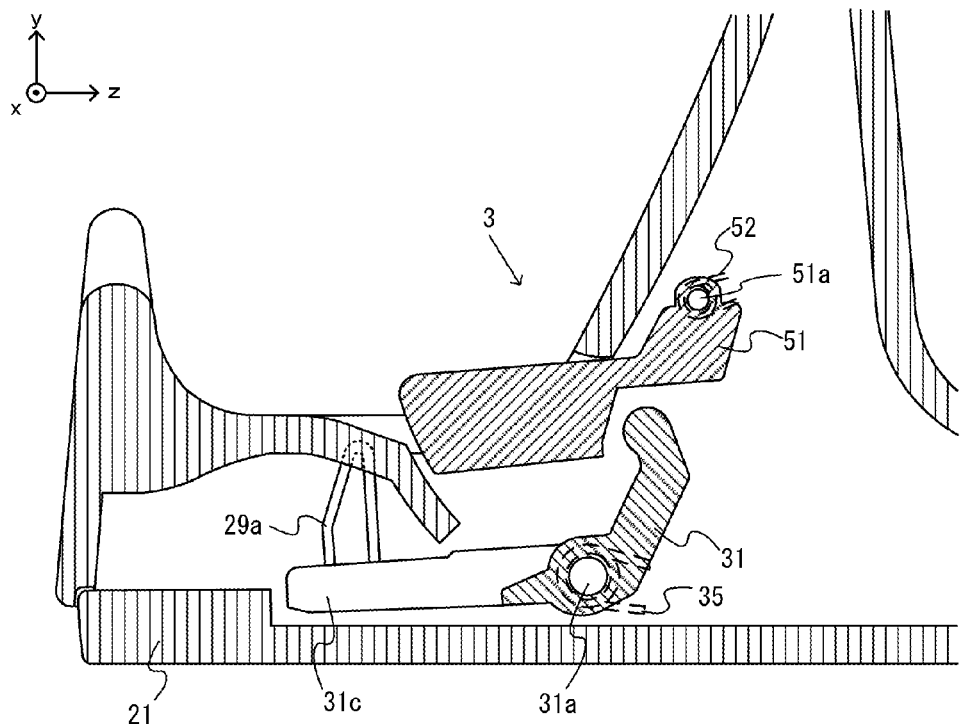
FIG. 23 is a diagram showing a non-limiting example of the configuration of a charging apparatus according to the other embodiment.

It should be noted that examples of the configuration in which the charging terminals 29a and 29b do not move in the predetermined period from the reference state may include, for example, the configuration in which a gap is provided between the first movable member and the second movable member in the reference state. FIG. 23 is a diagram showing an example of the configuration of a charging apparatus according to the other embodiment. It should be noted that in FIG. 23, the components similar to those of the above embodiment are designated by the same numerals, and are not described in detail here.

In FIG. 23, a first movable member 51 is provided rotatably about a shaft 51a. Further, in the variation shown in FIG. 23, the charging apparatus 3 includes a biasing member 52 that biases the first movable member 51 so as to enter the reference state. The biasing member 52 may have any specific configuration. In the present variation, the biasing member 52 is, for example, a torsion spring attached around a shaft 52a. Further, the first movable member 51 is away from the second movable member 31 in the reference state.

In the present variation, if the first movable member 51 has been pressed down by the portable apparatus 2 when the portable apparatus 2 is mounted on the charging apparatus 3, the first movable member 51 moves the second movable member 31 by abutting the second movable member 31 in accordance with the pressing down of the first movable member 51 by the predetermined amount P2 or more. Thus, in the present variation, it is possible to prevent the charging terminals 29a and 29b from moving (protruding) until the first movable member 51 is pressed down by the predetermined amount P2.

Figure 24:
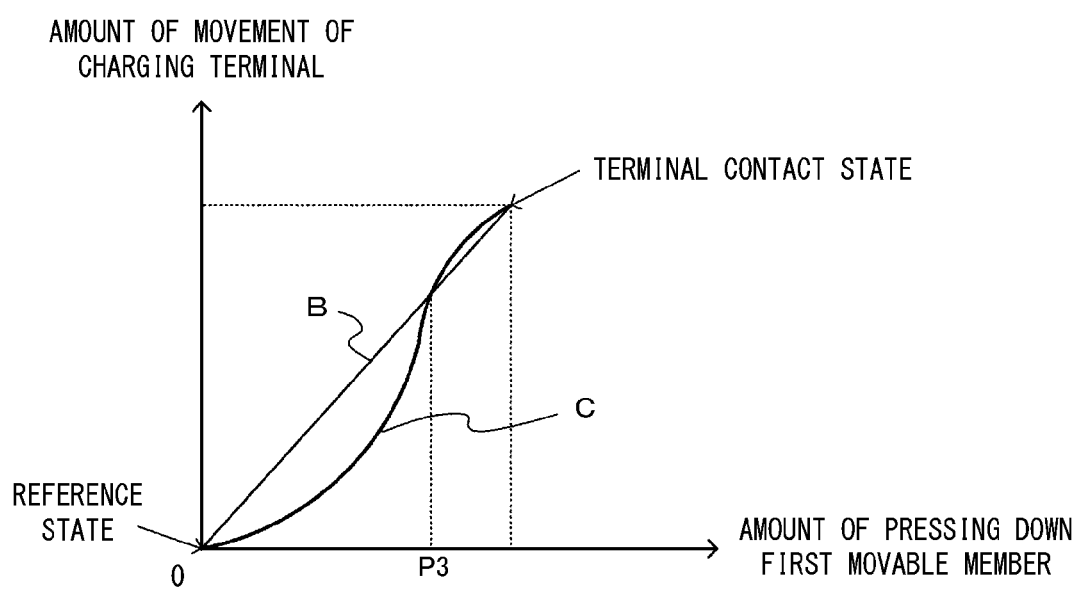
FIG. 24 is a diagram showing another non-limiting example of the relationship between the amount of pressing down the first movable member and the amount of movement of each of the charging terminals in the other embodiment.

In addition, in the above embodiment, the period (the above period from the reference state to the intermediate state) in which the actual terminal movement amount is smaller than the terminal movement amount (referred to as a "proportional movement amount") in the case where the terminal movement amount is proportional to the amount of pressing down is, in the entire period from the reference state to the terminal contact state, the period except for the terminal contact state (see FIG. 8). Here, in another embodiment, the period in which the actual terminal movement amount is smaller than the proportional movement amount may be a given period starting from the reference state. For example, the actual terminal movement amount may be larger than the proportional movement amount during a predetermined period before the terminal contact state. FIG. 24 is a diagram showing another example of the relationship between the amount of pressing down the first movable member and the terminal movement amount of the charging terminals. Referring to FIG. 24, during the period from the reference state to the state (the intermediate state) where the amount of pressing down the first movable member 25 is P3, the actual terminal movement amount (a curve C) is smaller than the proportional movement amount (a straight line B). During the period from the state where the amount of pressing down is P3 to the terminal contact state, the actual terminal movement amount (the curve C) is larger than the proportional movement amount (the straight line B). Also in the case shown in FIG. 24, similarly to the above embodiment, it is possible to make the change in the terminal movement amount of the charging terminals relatively smaller in the state where the first movable member is starting to be pressed down (than in the subsequent state). This makes it possible to reduce the possibility that the charging terminals 29a and 29b become caught by the portable apparatus 2.

It should be noted that the first movable member 25 and the second movable member 31 may be configured such that at least during the period in which the positions of the charging terminals 29a and 29b and the positions of the charge-receiving terminals 16a and 16b do not coincide with each other, the actual terminal movement amount is smaller than the proportional movement amount. In other words, the intermediate state described above may include at least the state where the positions of the charging terminals 29a and 29b and the positions of the charge-receiving terminals 16a and 16b do not coincide with each other. This makes it possible to suppress the amount of protrusion of the charging terminals 29a and 29b when the positions of the opposing terminals do not coincide with each other. Thus, it is possible to reduce the possibility that the charging terminals 29a and 29b come into contact with (become caught by) portions other than the charge-receiving terminals 16a and 16b of the portable apparatus 2.

In addition, in the above embodiment, the slope of the change in the terminal movement amount is set to increase as the amount of pressing down increases. Here, in another embodiment, for example, as shown in FIG. 24, the above slope may decrease during a part of the period from the reference state to the terminal contact state.

The above embodiments can be used for a charging apparatus for charging a portable apparatus and the like, in order, for example, to mount a portable apparatus on a charging apparatus more easily.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A charging apparatus for charging a portable apparatus, the charging apparatus comprising:
   a housing;
   a first movable member configured such that at least a part of the first movable member protrudes to an outside of the housing through a first opening portion provided in the housing, and configured to be pressed down by mounting the portable apparatus on the housing;
   a charging terminal; and
   a second movable member connected to the charging terminal, and configured to accommodate the charging terminal in the housing in a reference state where the first movable member is not pressed down, and when the first movable member has been pressed down, cause the charging terminal to protrude to the outside of the housing through a second opening portion provided in the housing, so as to enter a terminal contact state where the charging terminal can come into contact with a charge-receiving terminal of the portable apparatus, the first movable member and the second movable member being configured such that an amount of movement of the charging terminal during a period from the reference state to a predetermined intermediate state is smaller than the amount of movement during the same period in a case where the charging terminal moves from the reference state to the terminal contact state by an amount proportional to an amount of pressing down the first movable member.

2. The charging apparatus according to claim 1, wherein the first movable member and the second movable member are configured such that the amount of movement of the charging terminal per unit amount of pressing down the first movable member is larger in a predetermined second state where the amount of pressing down the first movable member from the reference state is relatively large, than in a predetermined first state where the amount of pressing down the first movable member from the reference state is relatively small.

3. The charging apparatus according to claim 2, wherein at least one of the first movable member and the second movable member is configured to be rotationally movable;

the first movable member moves the second movable member by a first abutment part of the first movable member pressing a second abutment part of the second movable member, the first abutment part being a part of the first movable member that abuts the second movable member, the second abutment part being a part of the second movable member that abuts the first movable member; and the first movable member and the second movable member are configured such that an angular difference between a moving direction of the first abutment part and a moving direction of the second abutment part is smaller in the second state than in the first state.

4. The charging apparatus according to claim 1, wherein the first movable member is rotatable about a predetermined first shaft;

the second movable member is rotatable about a second shaft generally parallel to the first shaft; and the first movable member moves the second movable member by rotating about the first shaft while changing a position in the first movable member that abuts the second movable member and a direction in which the first movable member presses down the second movable member.

5. The charging apparatus according to claim 4, wherein the first movable member includes:
   a press-down surface configured to protrude through the first opening portion in the reference state, and configured to come into contact with the portable apparatus when the portable apparatus has been mounted on the housing; and
   a first abutment surface provided on the same side as the press-down surface with respect to the first shaft, and configured to abut the second movable member, and
the second movable member includes:
   an abutment portion having at an end portion thereof a second abutment surface configured to abut the first abutment surface; and
   a supporting portion connected to the abutment portion at one end thereof, and supporting the charging terminal at the other end.

6. The charging apparatus according to claim 1, wherein the first movable member is configured to be rotationally movable, and configured such that an amount of rotation of the first movable member per unit amount of pressing down the first movable member is larger in a predetermined second state where the amount of pressing down the first movable member from the reference state is relatively large, than in a predetermined first state where the amount of pressing down the first movable member from the reference state is relatively small.

7. The charging apparatus according to claim 1, wherein the first movable member and the second movable member are configured such that an amount of movement of the second movable member per unit amount of movement of the first movable member is larger in a predetermined second state where the amount of pressing down the first movable member from the reference state is relatively large, than in a predetermined first state where the amount of pressing down the first movable member from the reference state is relatively small.

8. The charging apparatus according to claim 1, further comprising
   a biasing member configured to bias the second movable member so that the second movable member presses the first movable member so as to enter the reference state.

9. The charging apparatus according to claim 1, further comprising:
   a first biasing member configured to bias the first movable member so as to enter the reference state; and
   a second biasing member configured to bias the second movable member so that the charging terminal is accommodated in the housing, wherein
   the first movable member is away from the second movable member in the reference state, and moves the second movable member by abutting the second movable member in accordance with pressing down of the first movable member by a predetermined amount or more.

10. The charging apparatus according to claim 1, wherein the first movable member and the second movable member are configured such that positions in the first movable member that abut the second movable member change discontinuously during a change from the reference state to the terminal contact state.

11. The charging apparatus according to claim 1, further comprising
   a rotating member provided such that at least a part of the rotating member protrudes to the outside of the housing through a third opening portion provided on a mounting surface on which the portable apparatus is mounted in the housing, the rotating member being rotatable in a predetermined direction.

12. The charging apparatus according to claim 11, wherein the rotating member is composed of at least two rotating members; and
   the first movable member is provided so as to protrude through the first opening portion formed at a position between the two rotating members, and so as not to protrude beyond a line segment connecting extremity portions of the two rotating members.

13. The charging apparatus according to claim 11, wherein the rotating member is provided so as to protrude beyond the first movable member with respect to a predetermined reference plane.

14. A charging system including a portable apparatus and a charging apparatus for charging the portable apparatus,
   the portable apparatus comprising a charge-receiving terminal, and the charging apparatus comprising:
- a housing;
- a first movable member configured such that at least a part of the first movable member protrudes to an outside of the housing through a first opening portion provided in the housing, and configured to be pressed down by mounting the portable apparatus on the housing;
- a charging terminal; and
- a second movable member connected to the charging terminal, and configured to accommodate the charging terminal in the housing in a reference state where the first movable member is not pressed down, and when the first movable member has been pressed down, cause the charging terminal to protrude to the outside of the housing through a second opening portion provided in the housing, so as to enter a terminal contact state where the charging terminal can come into contact with a charge-receiving terminal of the portable apparatus,
- the first movable member and the second movable member being configured such that an amount of movement of the charging terminal during a period from the reference state to a predetermined intermediate state is smaller than the amount of movement during the same period in a case where the charging terminal moves from the reference state to the terminal contact state by an amount proportional to an amount of pressing down the first movable member.

15. The charging system according to claim 14, wherein
a hole is formed in the portable apparatus on a surface on which the charge-receiving terminal is provided,
the charging apparatus further comprising
- a rotating member provided, at such a position as to be inserted into the hole of the portable apparatus when the charge-receiving terminal and the charging terminal are connected together, such that at least a part of the rotating member protrudes to the outside of the housing, the rotating member being rotatable in a predetermined direction.

16. The charging system according to claim 15, wherein
the rotating member is composed of at least two rotating members; and
the first movable member is provided so as to protrude through the first opening portion formed at a position between the two rotating members, and so as not to protrude beyond a line segment connecting extremity portions of the two rotating members.

17. The charging system according to claim 15, wherein
the rotating member is provided so as to protrude beyond the first movable member with respect to a predetermined reference plane.

18. The charging system according to claim 15, wherein
the portable apparatus and the charging apparatus are configured such that the portable apparatus does not move the first movable member in a state where a part of the rotating member is not inserted in the hole of the portable apparatus.

19. The charging system according to claim 15, wherein
the first movable member and the second movable member are configured such that the charging terminal is accommodated in the housing in a state where a part of the rotating member is not inserted in the hole of the portable apparatus.

20. A method of connecting a charging terminal of a charging apparatus for charging a portable apparatus to a charge-receiving terminal of the portable apparatus,
the charging apparatus comprising a first movable member configured to be pressed down,
the method comprising:
- in a reference state where the first movable member is not pressed down, causing at least a part of the first movable member to protrude to an outside of a housing of the charging apparatus through a first opening portion provided in the housing, and accommodating the charging terminal in the housing;
- when the first movable member has been pressed down, causing the charging terminal to protrude through a second opening portion provided in the housing, so as to enter a terminal contact state where the charging terminal can come into contact with the charge-receiving terminal of the portable apparatus, thereby connecting the charging terminal to the charge-receiving terminal; and
- moving the charging terminal such that an amount of movement of the charging terminal during a period from the reference state to a predetermined intermediate state is smaller than the amount of movement during the same period in a case where the charging terminal moves from the reference state to the terminal contact state by an amount proportional to an amount of pressing down the first movable member.

* * * * *